US011097217B2

(12) United States Patent
Barry et al.

(10) Patent No.: US 11,097,217 B2
(45) Date of Patent: Aug. 24, 2021

(54) VARIABLE AIR FILTER ASSEMBLIES

(71) Applicant: Second Nature Brands, Inc., Raleigh, NC (US)

(72) Inventors: Kevin James Barry, Raleigh, NC (US); Thaddeus Worth Tarkington, Raleigh, NC (US); Aly Khalifa, Raleigh, NC (US)

(73) Assignee: Second Nature Brands, Inc., Raleigh, NC (US)

( * ) Notice: Subject to any disclaimer, the term of this patent is extended or adjusted under 35 U.S.C. 154(b) by 0 days.

(21) Appl. No.: 16/569,696

(22) Filed: Sep. 13, 2019

(65) Prior Publication Data
US 2020/0001220 A1 Jan. 2, 2020

Related U.S. Application Data

(63) Continuation of application No. 16/288,304, filed on Feb. 28, 2019, now Pat. No. 10,427,079.
(Continued)

(51) Int. Cl.
B01D 46/00 (2006.01)
B01D 46/52 (2006.01)
B01D 46/10 (2006.01)

(52) U.S. Cl.
CPC ..... B01D 46/0005 (2013.01); B01D 46/0002 (2013.01); B01D 46/10 (2013.01);
(Continued)

(58) Field of Classification Search
CPC ......... B01D 2275/203; B01D 46/0002; B01D 46/0005; B01D 46/521; B01D 2279/50; B01D 46/10
(Continued)

(56) References Cited

U.S. PATENT DOCUMENTS 1,887,737 A  11/1932 Wilfred
3,810,350 A   5/1974 Scholl
(Continued)

FOREIGN PATENT DOCUMENTS

EP  0651210 A2   2/1994
JP  2007038191 A1  2/2007
(Continued)

OTHER PUBLICATIONS

PCT, International Preliminary Report on Patentablity for International Patent Application No. PCT/US19/19947 dated Sep. 1, 2020, 5 pages.
(Continued)

Primary Examiner — Robert Clemente
(74) Attorney, Agent, or Firm — NK Patent Law

(57) ABSTRACT

An air filter assembly includes a filter element having at least one variable dimension, and a frame for engaging and supporting the filter element. The frame may include a plurality of linear segments forming a rectangular configuration, and a plurality of clips for connecting the linear segments together at corners thereof. The linear segments may be L-channel segments, C-channel segments, or may be of other form. Clips may be used for connecting the linear segments together at the corners. The filter element may have a pattern of creases or fold lines to facilitate folding thereof from an expanded configuration to a reduced configuration. A grate may be included for spanning an area bounded by the frame to support the filter element. The grate may have multiple arms and a central hub. An edge treatment may form a seal between the filter element and the frame.

15 Claims, 55 Drawing Sheets

Related U.S. Application Data

(60) Provisional application No. 62/636,581, filed on Feb. 28, 2018, provisional application No. 62/694,091, filed on Jul. 5, 2018.

(52) U.S. Cl.
CPC ........ B01D 46/521 (2013.01); *B01D 2265/02* (2013.01); *B01D 2271/02* (2013.01); *B01D 2275/203* (2013.01); *B01D 2279/50* (2013.01)

(58) Field of Classification Search
USPC .......................................................... 55/496
See application file for complete search history.

(56) References Cited

U.S. PATENT DOCUMENTS

| | | |
|---|---|---|
| 4,123,239 A | 10/1978 | Andersson et al. |
| 4,925,468 A | 5/1990 | Kishi et al. |
| 5,230,799 A | 7/1993 | Willard et al. |
| 5,273,563 A | 12/1993 | Pasch et al. |
| 5,273,564 A | 12/1993 | Hill |
| 5,743,927 A | 4/1998 | Osendorf |
| 5,792,228 A * | 8/1998 | Fath ................ B01D 29/07 55/497 |
| 5,797,975 A | 8/1998 | Davis |
| 5,840,094 A | 11/1998 | Osendorf et al. |
| 6,039,777 A | 3/2000 | Lee |
| 6,814,773 B2 | 11/2004 | Shah et al. |
| 8,197,569 B2 | 6/2012 | Healey et al. |
| 8,231,700 B2 | 7/2012 | Sundet |
| 8,419,817 B2 | 4/2013 | Sundet et al. |
| 8,834,611 B1 | 9/2014 | Dimicelli |
| 9,630,136 B2 | 4/2017 | Dressler et al. |
| 9,687,771 B2 | 6/2017 | Healey et al. |
| 2001/0020512 A1 | 9/2001 | Heilmann et al. |
| 2002/0100264 A1 | 8/2002 | Rivera et al. |
| 2003/0066274 A1 | 4/2003 | Fredrick et al. |
| 2003/0066275 A1 | 4/2003 | Schuld et al. |
| 2003/0066423 A1 | 4/2003 | Shah et al. |
| 2003/0066424 A1 | 4/2003 | Shah et al. |
| 2003/0066425 A1 | 4/2003 | Shah et al. |
| 2003/0230061 A1 | 12/2003 | Kubokawa et al. |
| 2004/0065066 A1 | 4/2004 | Mertz et al. |
| 2006/0005517 A1 | 1/2006 | Sundet et al. |
| 2006/0005518 A1 | 1/2006 | Duffy et al. |
| 2008/0047240 A1 | 2/2008 | Trautmann et al. |
| 2008/0066436 A1 | 3/2008 | Magee et al. |
| 2008/0067121 A1 | 3/2008 | Ter Horst et al. |
| 2008/0148698 A1 | 6/2008 | Nowak et al. |
| 2009/0019824 A1 | 1/2009 | Lawrence |
| 2009/0249755 A1 | 10/2009 | OLeary |
| 2009/0320426 A1 | 12/2009 | Braunecker et al. |
| 2010/0326028 A1 | 12/2010 | Sundet |
| 2012/0227366 A1 | 9/2012 | Aycock |
| 2013/0133301 A1 | 5/2013 | Sproule et al. |
| 2013/0205732 A1 | 8/2013 | Gillilan |
| 2014/0331623 A1 | 11/2014 | Gruenbacher et al. |
| 2015/0047507 A1 | 2/2015 | Fox et al. |
| 2015/0047508 A1 | 2/2015 | Sanocki et al. |
| 2015/0053081 A1 | 2/2015 | Sullivan |
| 2015/0267927 A1 | 9/2015 | Zhang et al. |
| 2016/0220940 A1 | 8/2016 | Dressler |
| 2016/0263515 A1 | 9/2016 | Zhang et al. |
| 2017/0151522 A1 | 6/2017 | Knuckles |
| 2017/0182445 A1 | 6/2017 | Zhang et al. |
| 2017/0241193 A1 | 8/2017 | Fox et al. |
| 2017/0312678 A1 | 11/2017 | Elliott |
| 2017/0320525 A1 | 11/2017 | Hall et al. |
| 2017/0348624 A1 | 12/2017 | Do |
| 2018/0021716 A1 | 1/2018 | Li et al. |
| 2018/0056224 A1 | 3/2018 | Barry et al. |

FOREIGN PATENT DOCUMENTS

| | | |
|---|---|---|
| WO | 2005074468 A2 | 8/2005 |
| WO | 2009096984 A1 | 8/2009 |

OTHER PUBLICATIONS

ISA/RU; International Search Report and Written Opinion for International Patent Application No. PCT/US19/19947 dated Jun. 27, 2019, 7 pages.

* cited by examiner

Single bungee grate layer

Doubled bungee grate layer

Four extruded "tent poles" are connected by a piece of bungee

Magnetic caps on the two ends help to close the frame corner

Grate hooks are set in the slit on the pole

Two pieces of notched strip can be assembled as a "hourglass" frame

Adhere filter fabric by double-sided tape on the strip

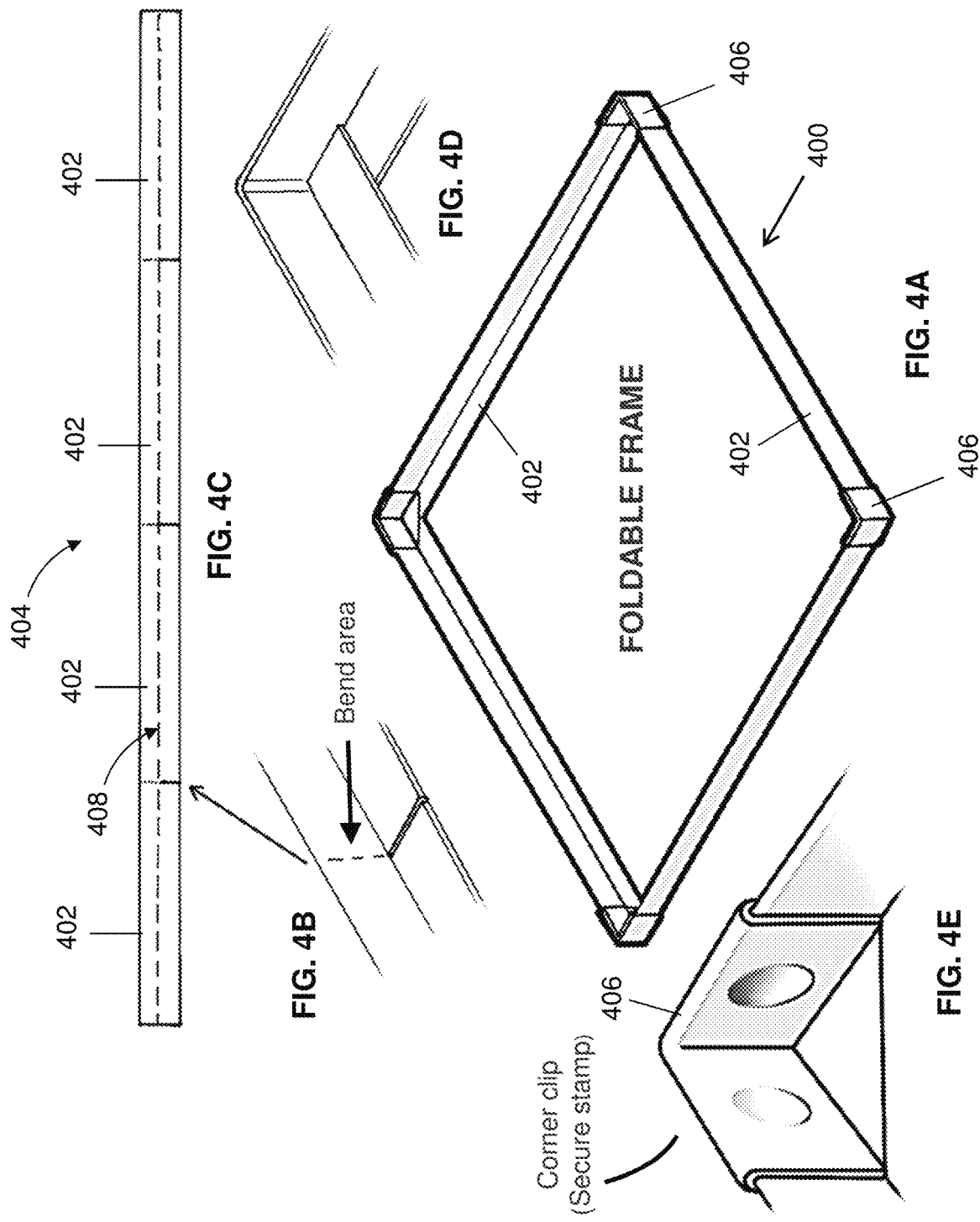

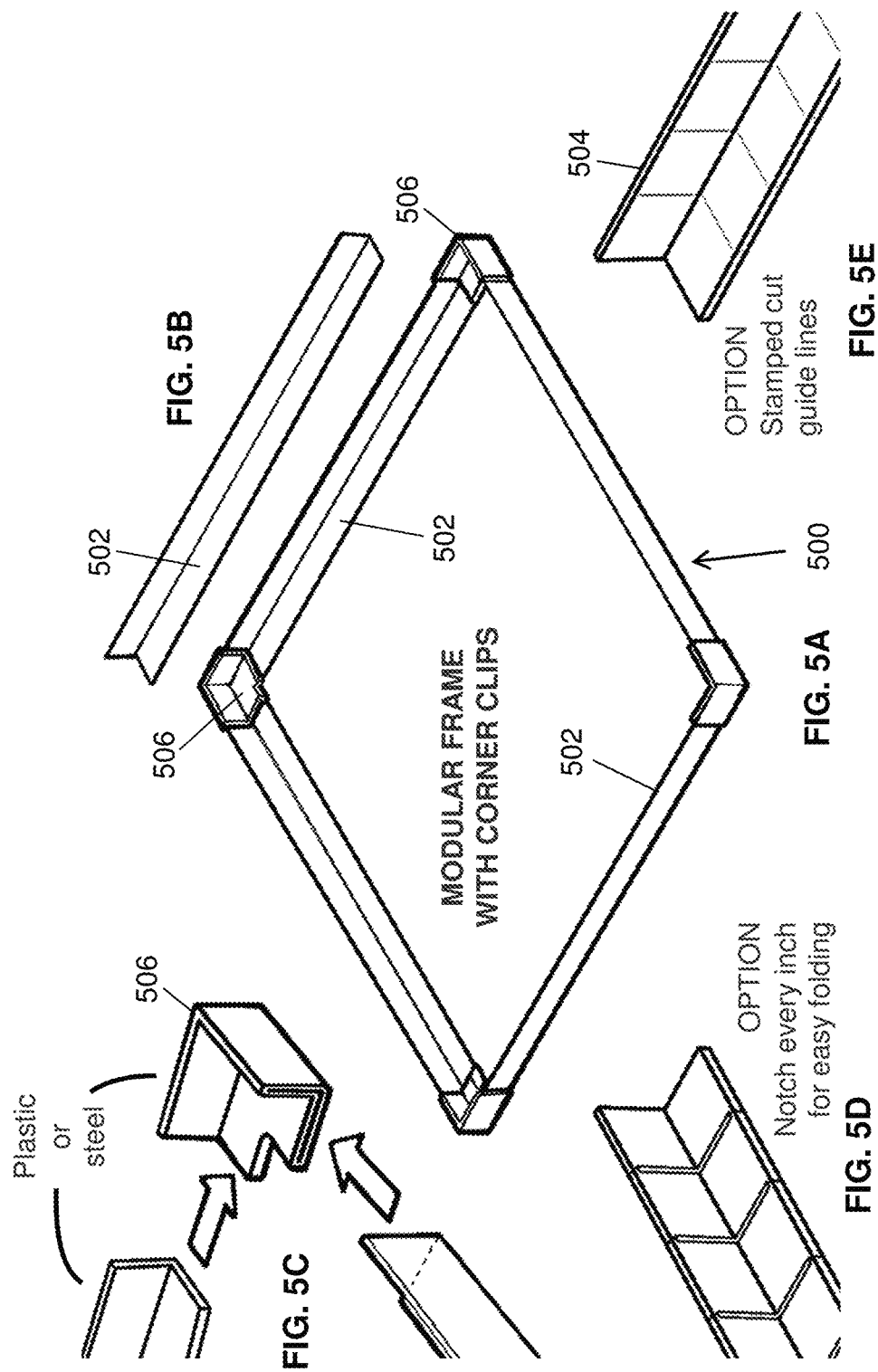

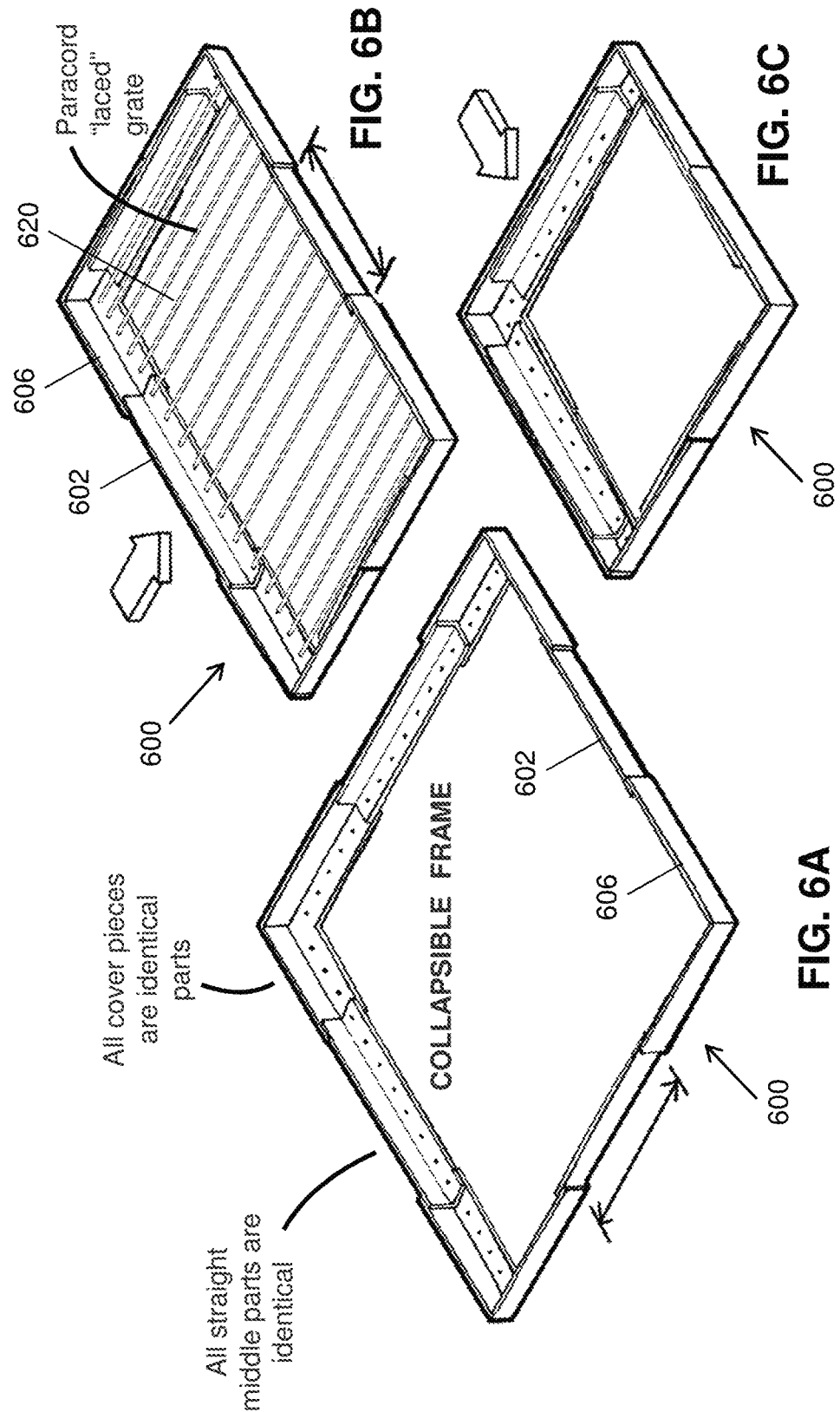

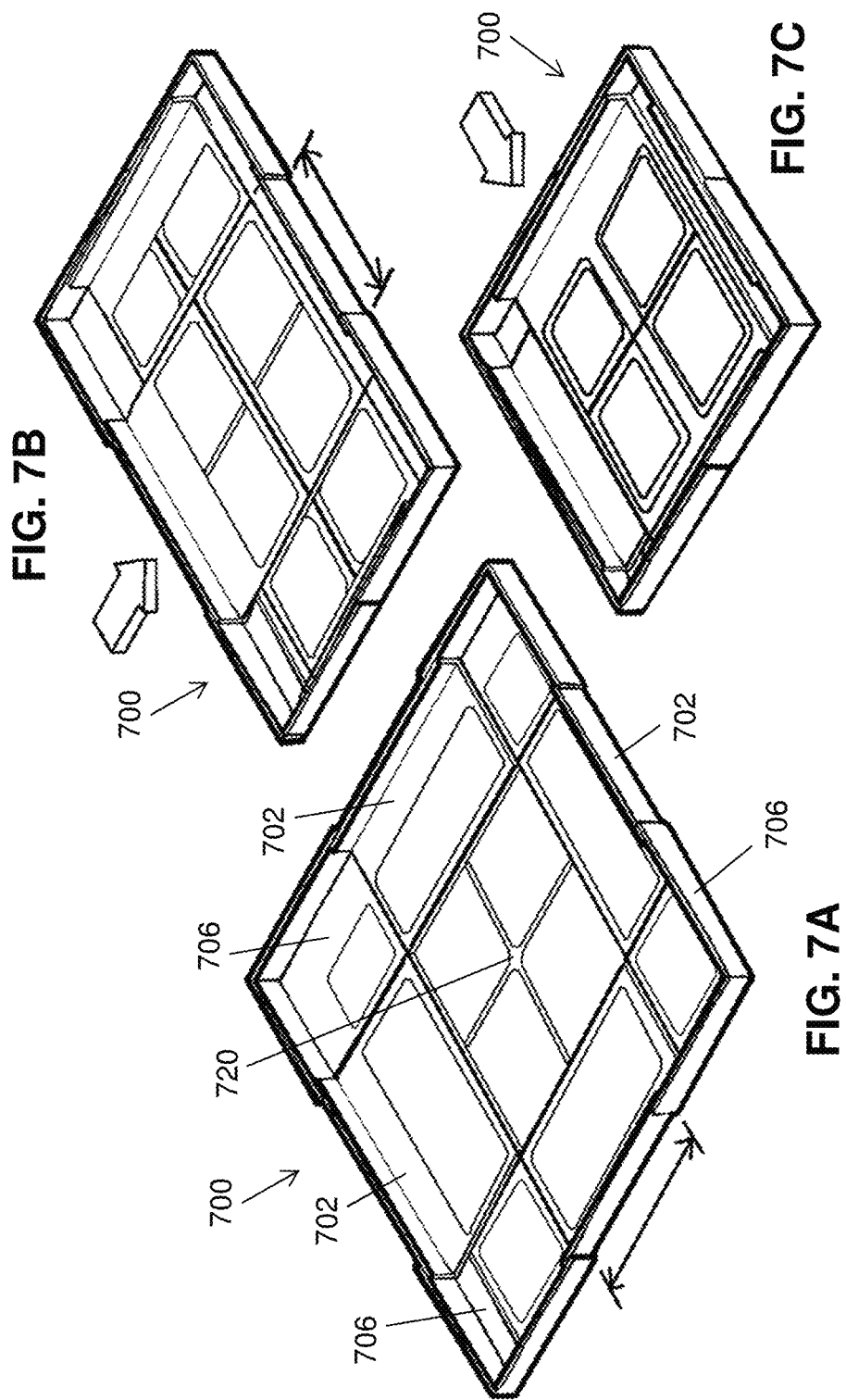

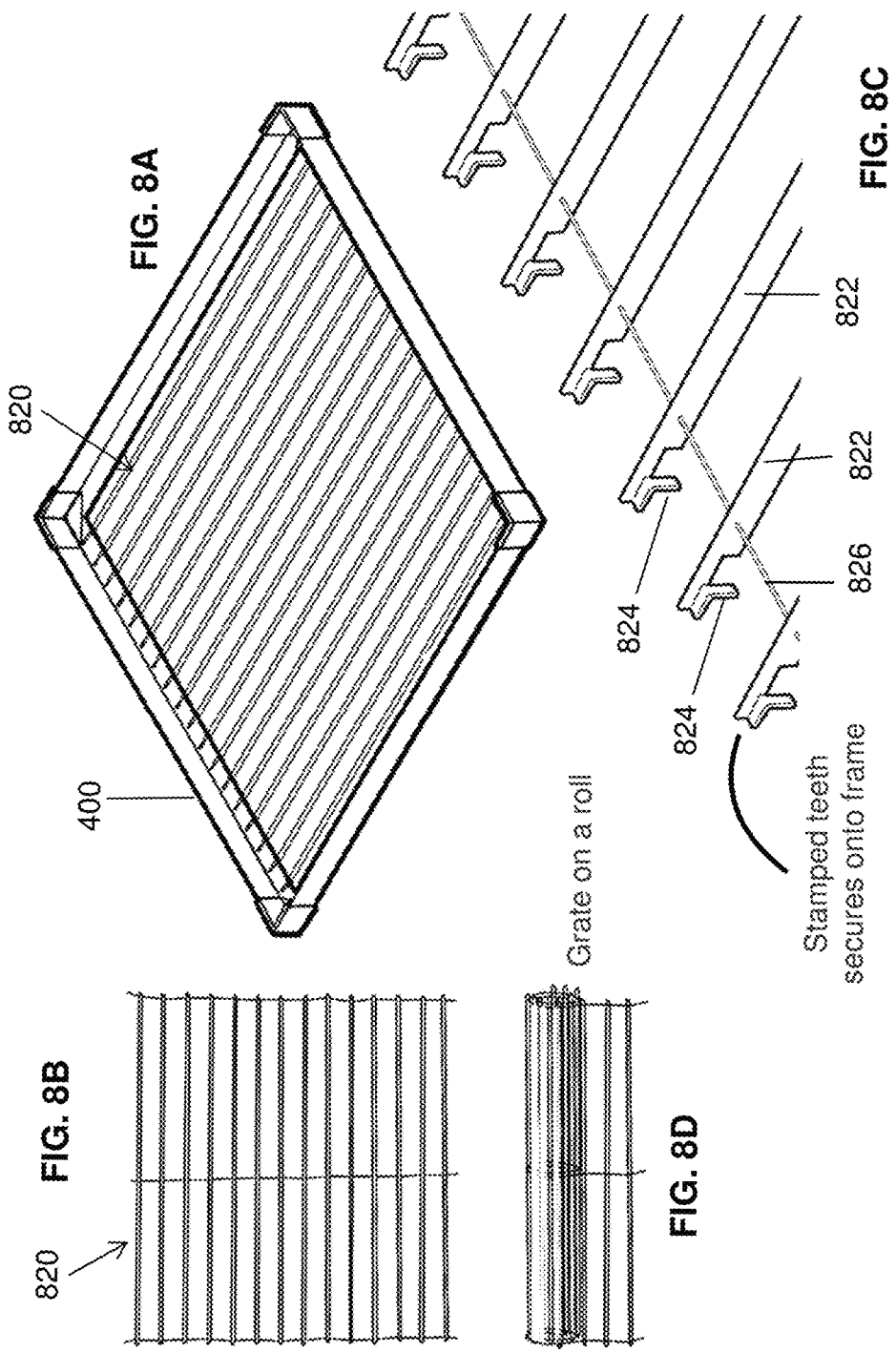

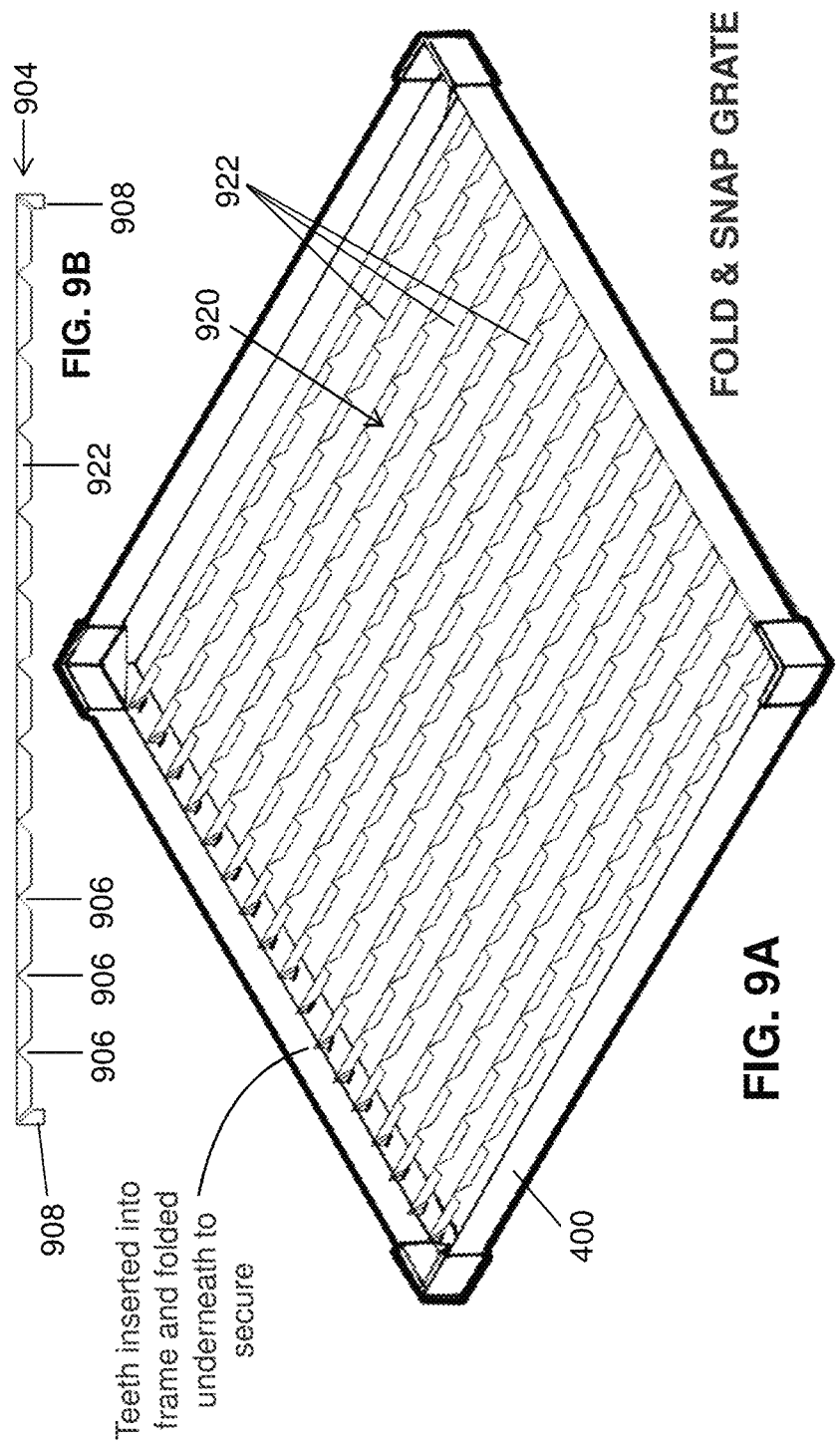

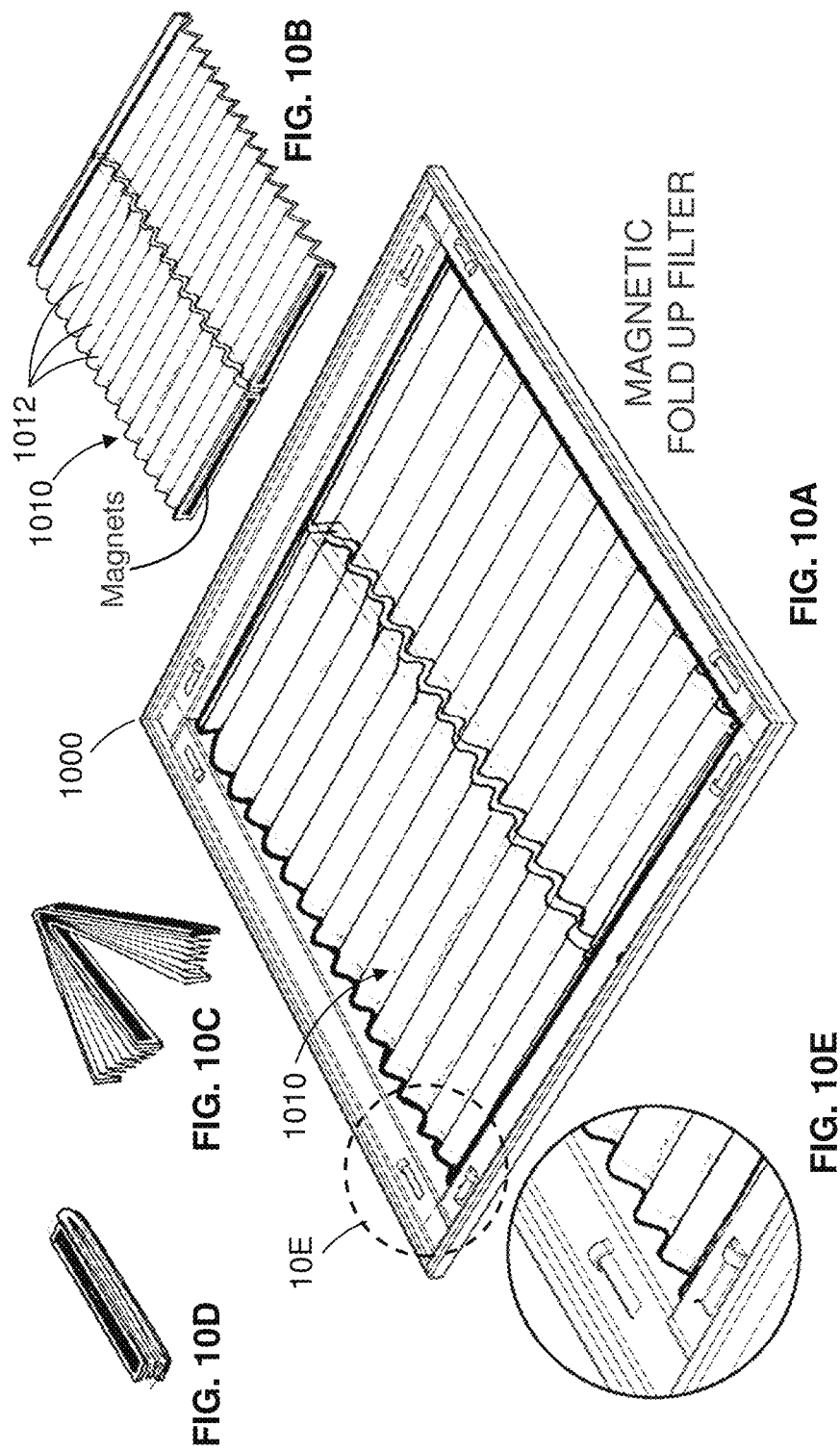

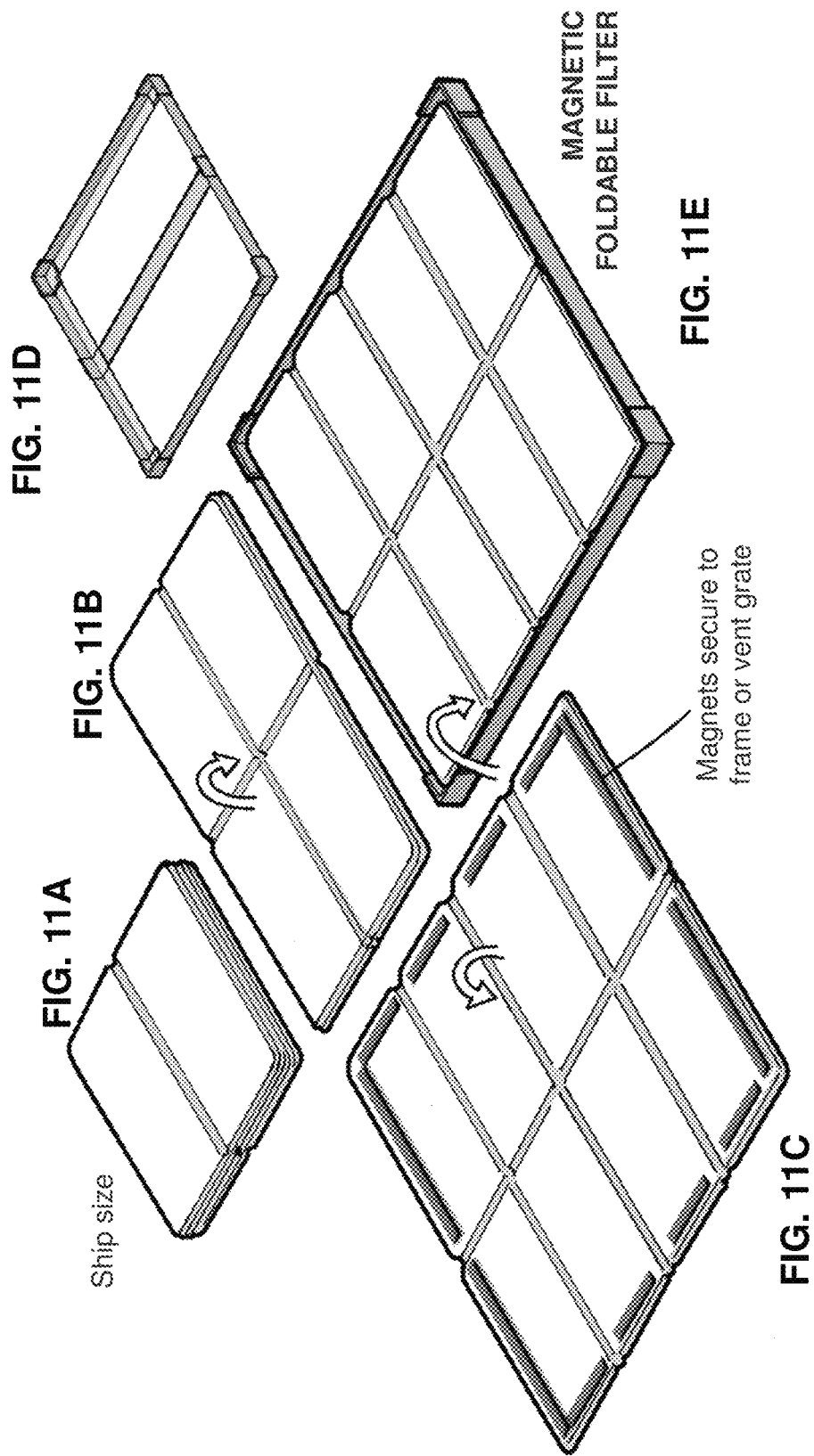

FLAT FILTER SANDWICH DESIGN

Extra edge filter acts as gasket seal

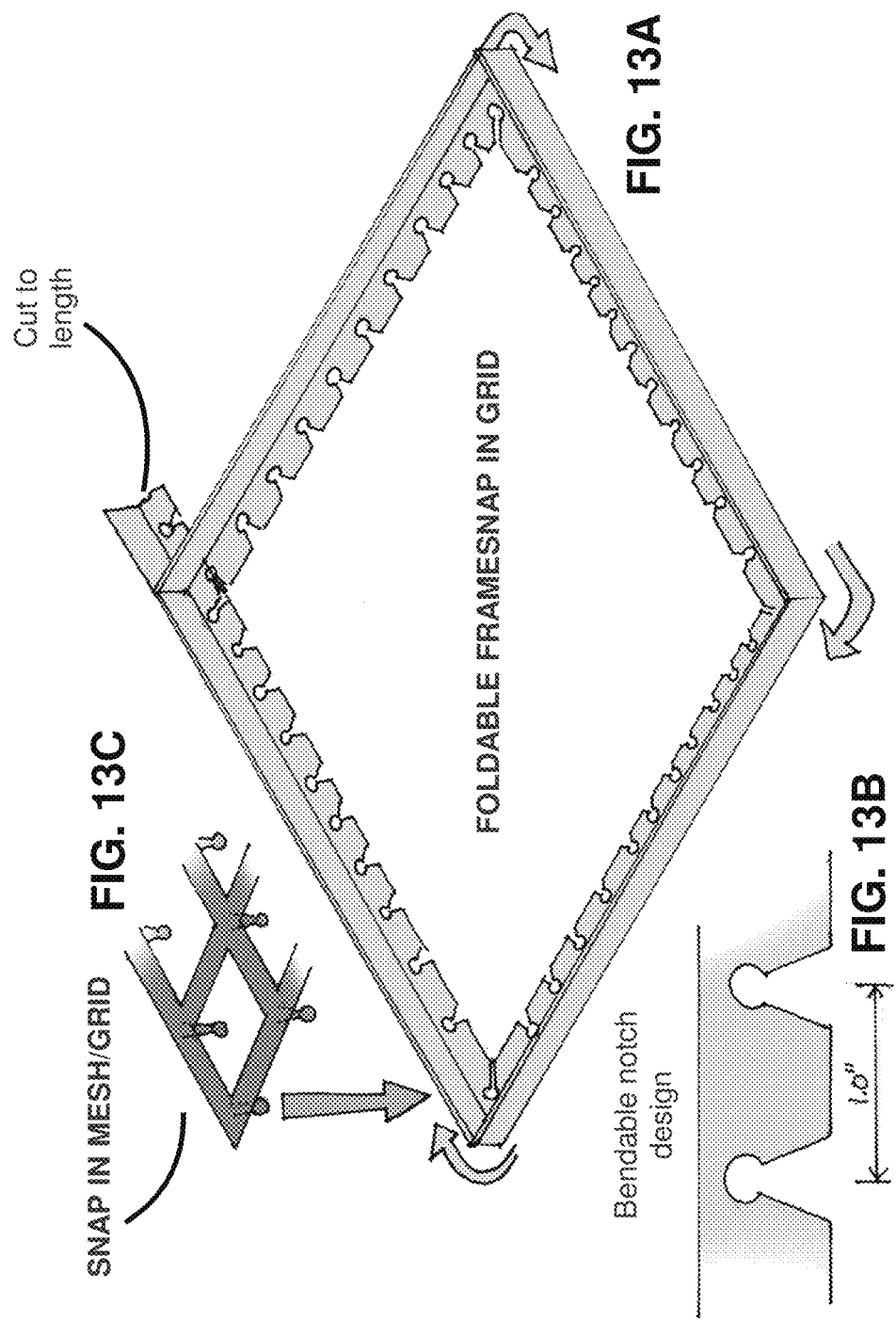

Assembled by bending and cutting.
Requires only two elements.

Bend a single frame element.
Lock into position with lattice element.

1. Cut to length

2. Snap on corners.

3. Snap in cross braces.

*no bending
*cut 4 sides and 2 braces
*assembling of 12 joints
*3 elements 1. cut grill to size 2. snap on channels

*no bending
*cut sheet
*assembly of 4 joints
*2 elements

POP-N X1 COVER

POP-N X2 COVER

FIG. 33B
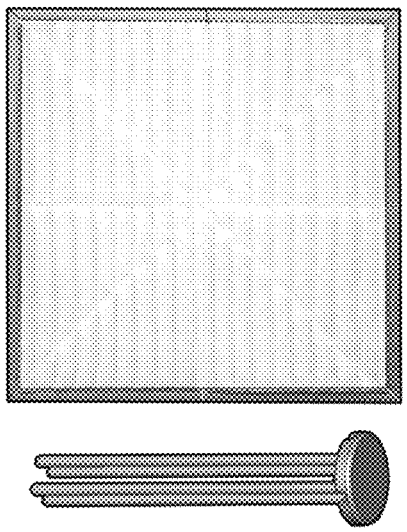
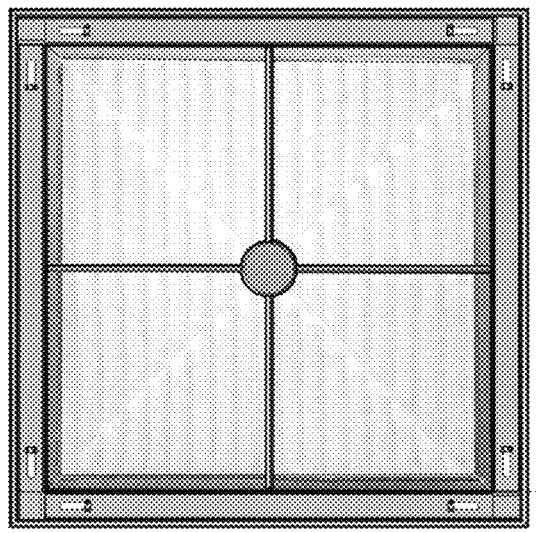
FIG. 33C
FIG. 33A

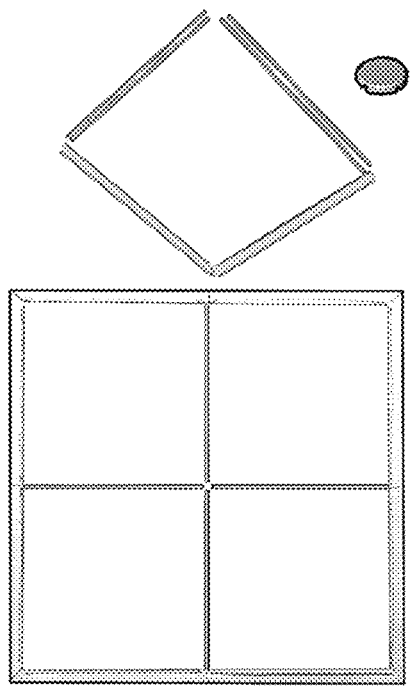
FIG. 34B
FIG. 34C
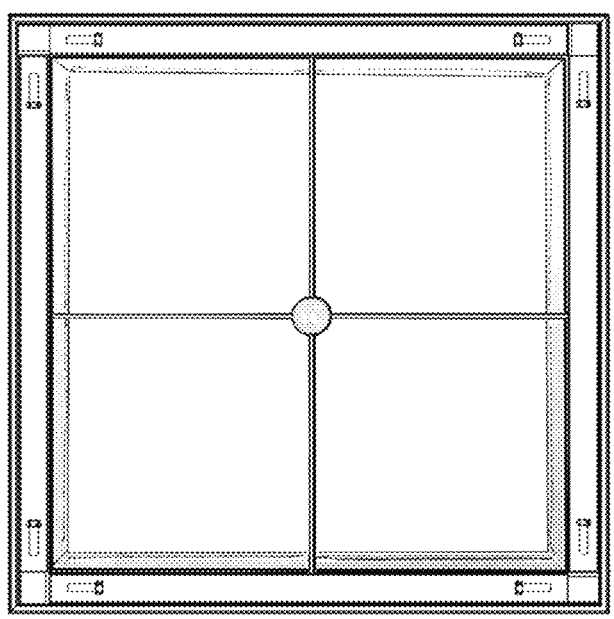
FIG. 34A

FIG. 36B
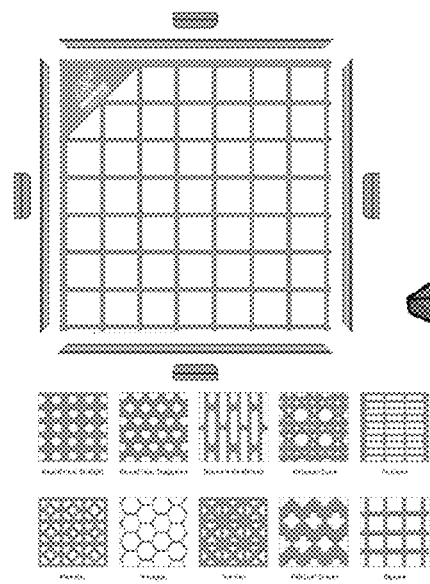
FIG. 36C
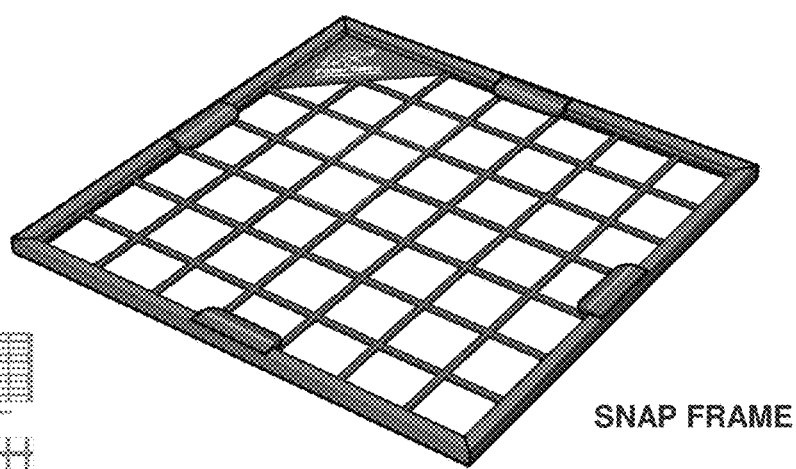
SNAP FRAME
FIG. 36A

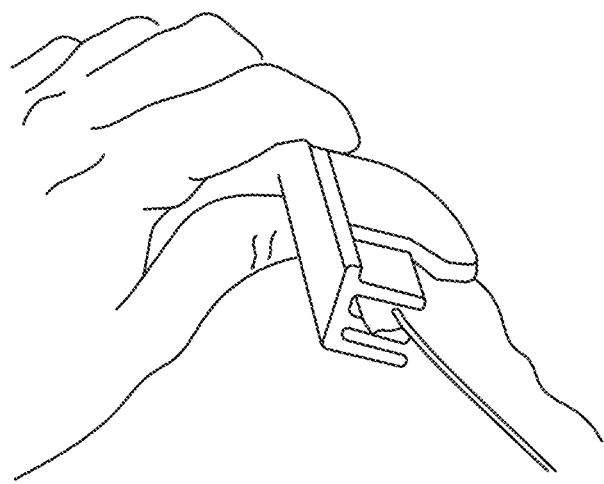
FIG. 37A
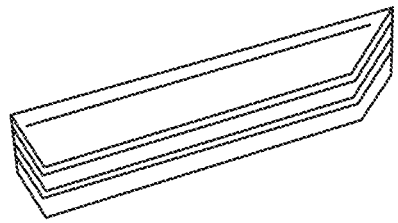
FIG. 37B
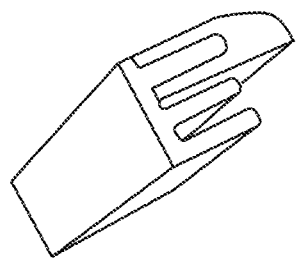 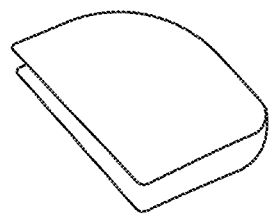
FIG. 37C          FIG. 37D

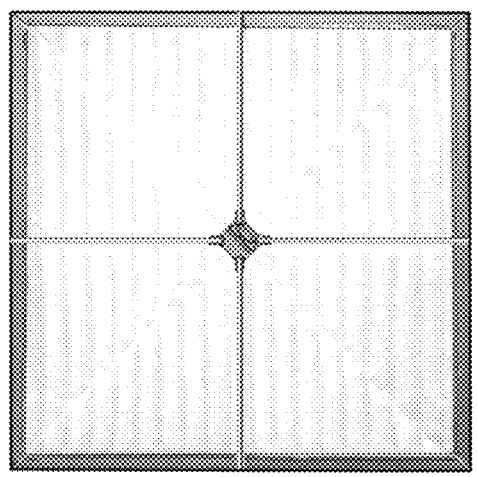
FIG. 39A
BOOMERANG
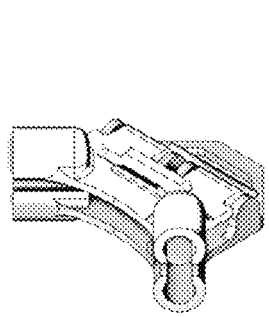   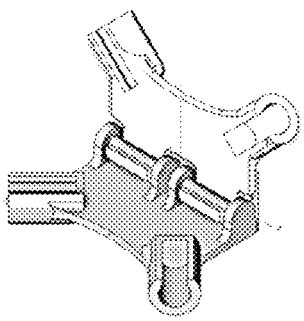   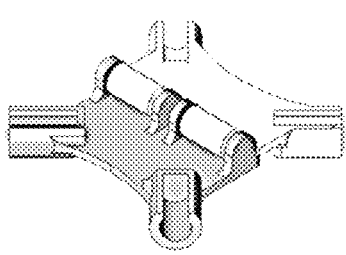
FIG. 39B          FIG. 39C          FIG. 39D
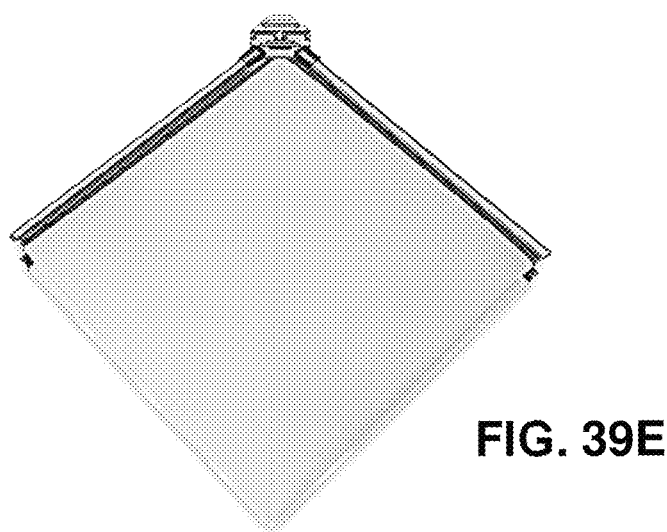
FIG. 39E

BOOMERANG IMPLEMENTATON

BOOMERANG EXTRUSION
PROFILE OPTIONS

EDGE TREATMENT

FILTER FOLDING

FOLDING PROFILE

LAMINATED STRUCTURED
MEDIA WITH
MECHANICAL HINGE

FOAM FRAME
EDGES

PLEATED PAPER TOP
LAMINATED TO FOAM

WEDGE PATTERNED FOAM
SUBSTRATE (See FIGS. 47B-47C)

Foam frame edges
(See FIGS. 48B)

HUB ONLY - REVERSE VIEW (NORMALLY HIDDEN BY FILTER MEDIA)

VARIABLE AIR FILTER ASSEMBLIES

CROSS-REFERENCE TO RELATED APPLICATION

This application is a continuation application of U.S. patent application Ser. No. 16/288,304 filed on Feb. 28, 2019, which claims the benefit of priority of: U.S. provisional patent application No. 62/636,581, titled "Systems, Components, Devices, and Methods for Foldable and Expandable Air Filters" filed on Feb. 28, 2018; and U.S. provisional patent application No. 62/694,091, titled "Variable Air Filter Assemblies," filed on Jul. 5, 2018, each of which is incorporated herein in its entirety by this reference.

TECHNICAL FIELD

The present disclosure relates to devices for air filtration. More particularly, the present disclosure relates to variably sized air filter assemblies.

BACKGROUND

Air filters for capturing dust, particulate matter, and other airborne materials such as animal hair and dander are available in varieties of prescribed rectangular sizes that are typically incremented by inches along each of two sides. Each typical home or business HVAC air-handling system requires periodic or occasional replacement of a particularly dimensioned filter, and consumers are thus burdened with finding an appropriately sized replacement. In reality, the receptacle structures of the air-handling systems are ultimately not precisely dimensioned according to even their nominal dimensions, and so even when an appropriately labeled filter is found, a perfect fit, with well-sealed edges, without any deformation of the replacement filter is ultimately not assured.

Compromises are thus made, including for example the use of filters that are bit small or large in one or both rectangular dimensions, and frustrated consumers even delay or neglect suggested periodic filter replacement. When air driven through an air-handling system bypasses an improperly fitted filter, airborne matter is not optimally trapped at the filter, which can permit the accumulation of matter on HVAC system components and cause or aggravate respiratory problems. When filter replacement schedules are missed, filter blockage by matter accumulated in an old filter can increase system power consumption and wear, and can harbor microbial growth, which also can also adversely affect respiratory health.

SUMMARY

This summary is provided to briefly introduce concepts that are further described in the following detailed descriptions. This summary is not intended to identify key features or essential features of the claimed subject matter, nor is it to be construed as limiting the scope of the claimed subject matter.

An air filter assembly according to at least one embodiment includes a filter element having at least one variable dimension, and a frame for engaging and supporting the filter element.

The frame may include a plurality of linear segments forming a rectangular configuration.

The linear segments may include at least one L-channel segment.

The linear segments may include at least one C-channel segment.

The air filter assembly may further include a plurality of clips for connecting the linear segments together at corners of the rectangular configuration.

The air filter assembly may further include at least one elasticized cord joining the linear segments.

The elasticized cord may have two terminal ends engaged together by at least one connector.

The elasticized cord may include a first end having a first connector; and a second end comprising a second connector.

The first connector may include a first magnet, and wherein the second connector may include a second magnet.

The linear segments form a rectangular configuration of variable dimensions.

The linear segments may be formed by bending or segmenting a primary strip into four segments.

Each of the linear segments may include a slotted edge, and two of the linear segments may engage when a slot of the slotted edge of one linear segment aligns with a slot of the slotted edge of another linear segment.

The frame may include a flexible arm biased toward a linear state.

The flexible arm may include a spring steel element having a cylindrically concave side and an opposing cylindrically convex side.

The profiled spring steel element may be self-biased toward a linear state, in which it extends along a longitudinal channel axis defined along the cylindrically concave side.

The air filter assembly may further include at least one grate element spanning an area defined by the frame for supporting the filter element.

The at least one grate element may include an elasticized cord passed through holes defined in the frame.

The frame may include frame elements having portions that are overlapped, and wherein the elasticized cord is passed through aligned holes in the overlapping portions thereby maintaining engagement of the frame elements.

The frame elements may include linear segments and corner pieces having overlapping portions maintained in engagement by the elasticized cord.

The grate element may include multiple parallel arms.

Each arm may include, at each of two ends thereof, a respective tooth for engaging the frame.

The arms may be interconnected by and regularly spaced along a cord.

The arms and cord may be rollable into a bundle.

The frame may include a first frame section having first teeth, and a second frame section having second teeth. The two frame sections may be configured to capture at least a portion of the filter element between the first teeth and second teeth when interlocked.

The at least one edge portion filter element may extend outward from the frame and captured portion of the filter element to define a gasket.

The air filter assembly may include a grate assembly having posts for aligning with and engaging notches defined by the frame.

The notches may each be wedge shaped, having an open mouth and narrowing toward a hole for receiving and retaining a post of the grate assembly.

The frame may include a frame segment having at least a first slot for retaining an edge of the filter element.

The air filter assembly may further include a screen, and the frame segment may have a second slot for retaining an edge of the screen.

The filter element may include a filter medium and an edge cuff mounted on an edge of the filter medium, and the edge cuff may be configured to be removably captured in the first slot.

The frame may include a folding hub and arms connected to the folding hub.

The arms may be connected to the filter element.

The folding hub may have a folded configuration and an expanded configuration.

The air filter assembly may further include an edge treatment for forming a peripheral seal.

The filter element may have a pattern of creases or fold lines to facilitate folding thereof from an expanded configuration to a reduced configuration.

The filter element may include a filter media element for filtering air passed therethrough, the filter media element may have at least one peripheral edge, and an edge treatment for attachment to the peripheral edge of the filter media element.

The edge treatment may include a deformable gasket, flange, or layer for forming a seal at the peripheral edge of the filter media element.

The edge treatment may form a seal between the filter media element and the frame.

The filter element may be twice foldable from an expanded rectangular configuration to a reduced configuration for shipping or storage.

The filter element may have a preformed fold pattern that facilitates reduction in two-dimensions.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

FIG. 4A is a variable frame assembly according to at least one embodiment.

FIG. 4B shows a bend area of an L-channel of the frame of the assembly of FIG. 4A, according to at least one embodiment.

FIG. 4C shows a linear strip from which the frame is formed, according to at least one embodiment.

FIG. 4D shows a corner junction of the frame, according to at least one embodiment.

FIG. 4E shows a corner junction of FIG. 4D secured by a clip, according to at least one embodiment.

FIG. 5A shows a modular frame assembly, according to at least one embodiment.

FIG. 5B shows an L-channel segments of the frame assembly of FIG. 5A, according to at least one embodiment.

FIG. 5C shows a corner junction of two segments with a corner clip, according to at least one embodiment.

FIG. 5D shows an L-channel segment of the frame as notched, according to at least one embodiment.

FIG. 5E shows an L-channel segment of the frame as stamped, according to at least one embodiment.

FIG. 6A shows a frame in an expanded state, according to at least one embodiment.

FIG. 6B shows the frame of FIG. 6A in a first reduced state and with a grate assembly, according to at least one embodiment.

FIG. 6C shows the frame of FIG. 6A in a second reduced state.

FIG. 7A shows a frame in an expanded state, according to at least one embodiment.

FIG. 7B shows the frame of FIG. 7A in a first reduced state and with a grate assembly, according to at least one embodiment.

FIG. 7C shows the frame of FIG. 7A in a second reduced state.

FIG. 8A shows a frame and a grate assembly according to at least one embodiment.

FIG. 8B shows the grate assembly of FIG. 8A in a planar state.

FIG. 8C shows a portion of the grate assembly of FIG. 8A in a closer view.

FIG. 8D shows the grate assembly of FIG. 8A in a partially rolled state.

FIG. 9A shows a frame and a grate assembly according to at least one embodiment.

FIG. 9B shows an arm of the grate assembly of FIG. 9A.

FIG. 10A shows a variable filter assembly according to at least one embodiment.

FIG. 10B shows the filter media element of FIG. 10A.

FIG. 10C shows the filter media element of FIG. 10A collapsed and bended.

FIG. 10D shows the filter media element of FIG. 10B further reduced to a shipping size.

FIG. 10E shows a close view of the corner portion of the filter assembly of FIG. 10A.

FIG. 11A is a filter media element in a sized minimized state, according to at least one embodiment.

FIG. 11B is the filter media element in a state reached by once unfolding from the state of FIG. 11A.

FIG. 11C is the filter media element in a state reached by twice unfolding from the state of FIG. 11A FIG. 11D is a frame according to at least one embodiment.

FIG. 11E is a filter assembly in which the filter media element in the state of FIG. 11C is engaged with the frame of FIG. 11D, according to at least one embodiment.

FIG. 13A shows a variable frame according to at least one embodiment.

FIG. 13B shows a portion of a linear segment of the frame of FIG. 13A, according to at least one embodiment.

FIG. 13C shows a corner portion of a mesh/grid, according to at least one embodiment.

FIG. 33A shows a filter assembly, according to at least one embodiment, having a filter media element and a support insert.

FIG. 33B shows the filter media element of FIG. 33A.

FIG. 33C shows the support insert of FIG. 33A in a collapsed state.

FIG. 34A shows a filter assembly, according to at least one embodiment, having a filter media element and a support insert.

FIG. 34B shows the support insert of FIG. 34A in a disassembled state.

FIG. 34C shows the filter media element of FIG. 34A.

FIG. 36A shows a frame and grate for a filter assembly according to at least one embodiment.

FIG. 36B shows the frame and grate of FIG. 36A, with the frame disassembled.

FIG. 36C shows multiple alternative grid patterns, according to various embodiments.

FIG. 37A is a view of an edge portion of a filter assembly, according to at least one embodiment.

FIG. 37B is a perspective view of a peripheral frame segment and mounted bezel clip of FIG. 37A, according to at least one embodiment.

FIG. 37C is a view of the frame segment of FIG. 37A.

FIG. 37D is a view of the bezel clip of FIG. 37A.

FIG. 39A shows a filter assembly according to at least one embodiment.

FIG. 39B shows a folding bracket hub, according to at least one embodiment, of the filter assembly of FIG. 39A in a folded state.

FIG. 39C shows the folding bracket hub of the filter assembly of FIG. 39A in ninety degree or half-opened state.

FIG. 39D is a perspective view of the folding bracket hub of the filter assembly of FIG. 39A in fully unfolded or opened state.

FIG. 39E shows the filter assembly of FIG. 39A in a folded state.

FIG. 42 shows a variety of arms for use with the folding bracket hub of FIG. 39B, according to various embodiments.

FIG. 43A is a perspective view of an edge treatment for a filter media element, according to at least one embodiment.

FIG. 43B is another perspective view of the edge treatment of FIG. 43A.

FIG. 44 shows an expandable filter media element having an advantageous fold pattern according to at least one embodiment.

FIG. 45A shows an expandable filter media element having an advantageous fold pattern according to at least one embodiment.

FIG. 45B is shows a filter assembly in an expanded state, according to at least one embodiment.

FIG. 46A shows a filter assembly including a filter media element having another advantageous fold pattern, according to at least one embodiment.

FIG. 46B shows a profiled spring steel element for use in arms that return the filter media element of FIG. 46A to its illustrated planar state once released from packaging, according to at least one embodiment.

FIG. 47A shows a first side of an expandable filter element, according to at least one embodiment, having a preferential fold pattern to facilitate two-dimensional reduction.

FIG. 47B shows a pleated paper top layer of the filter element of FIG. 47A, according to at least one embodiment.

FIG. 47C shows a foam substrate of the filter element of FIG. 47A, according to at least one embodiment.

FIG. 48A is another view of the expandable filter element of FIG. 47A, according to at least one embodiment.

Figure 47A:
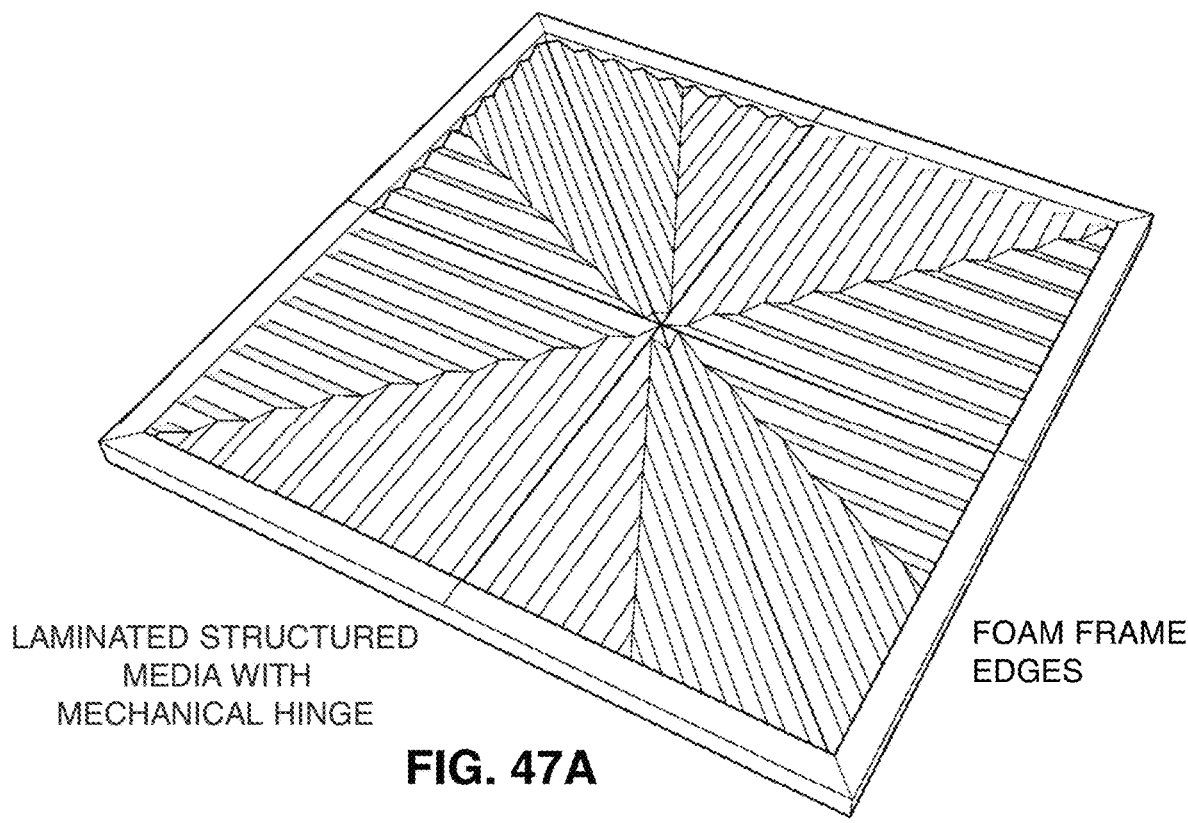
Figure 48A:
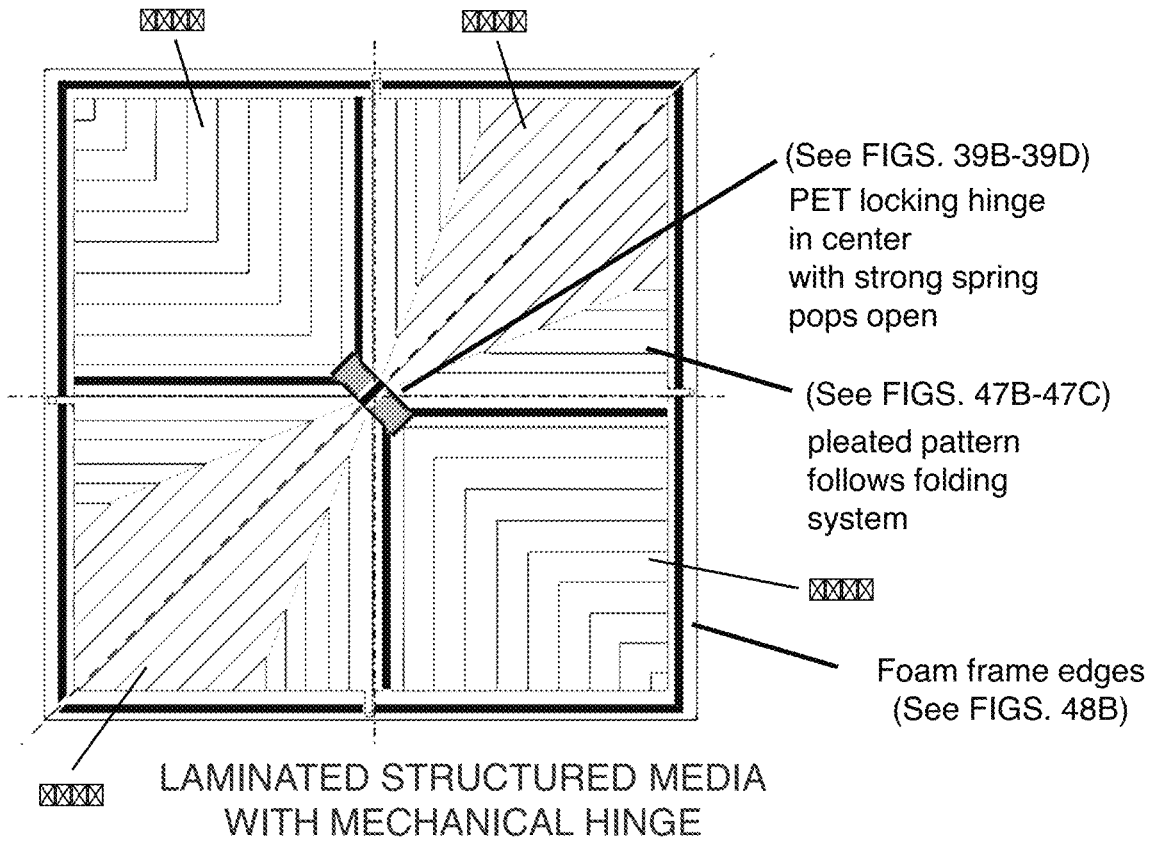
Figure 48B:
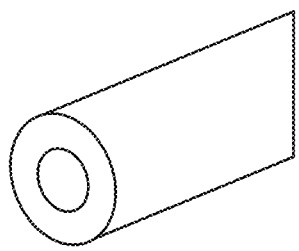

FIG. 48B shows a foam element for use as a frame edge mounted on the expandable filter element of FIG. 47A, according to at least one embodiment.

Figure 49:
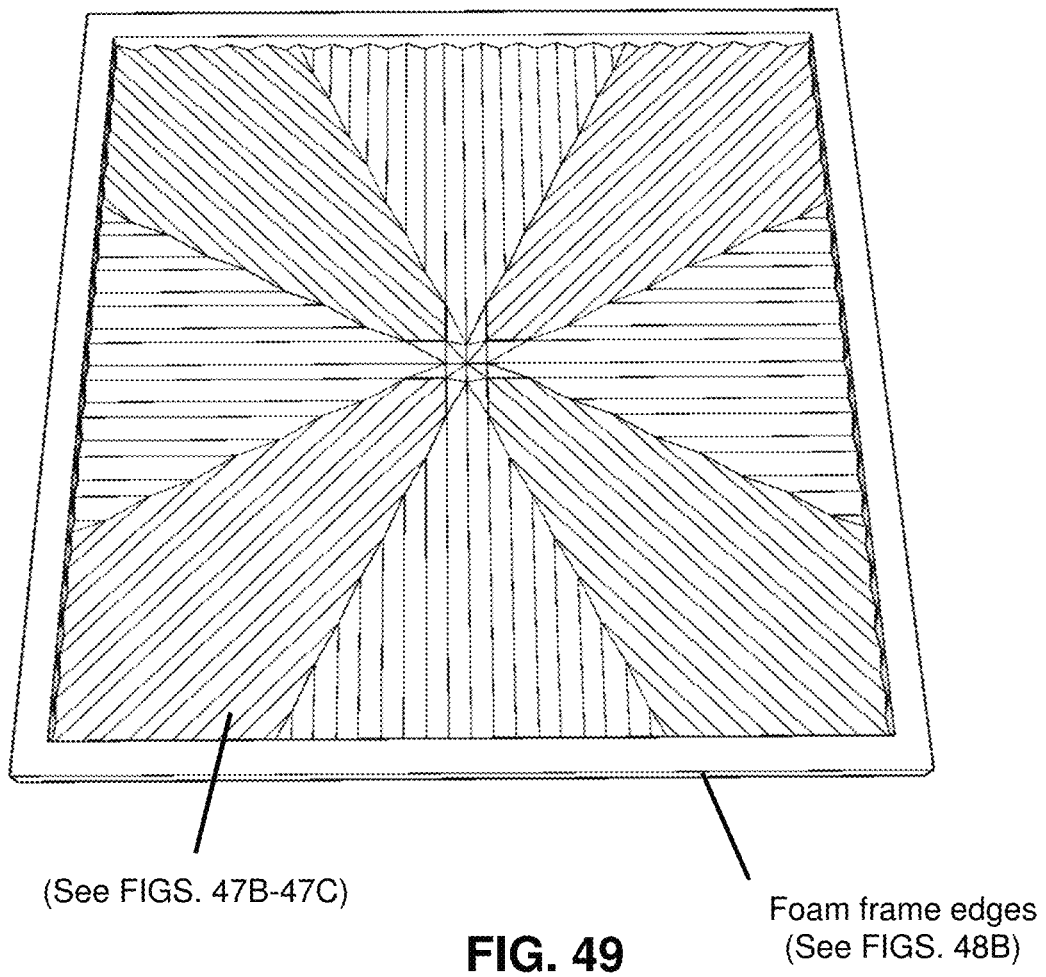

FIG. 49 shows a filter having a creased filter media element with an advantageous fold pattern to facilitate two-dimensional reduction, according to at least one embodiment.

Figure 50:
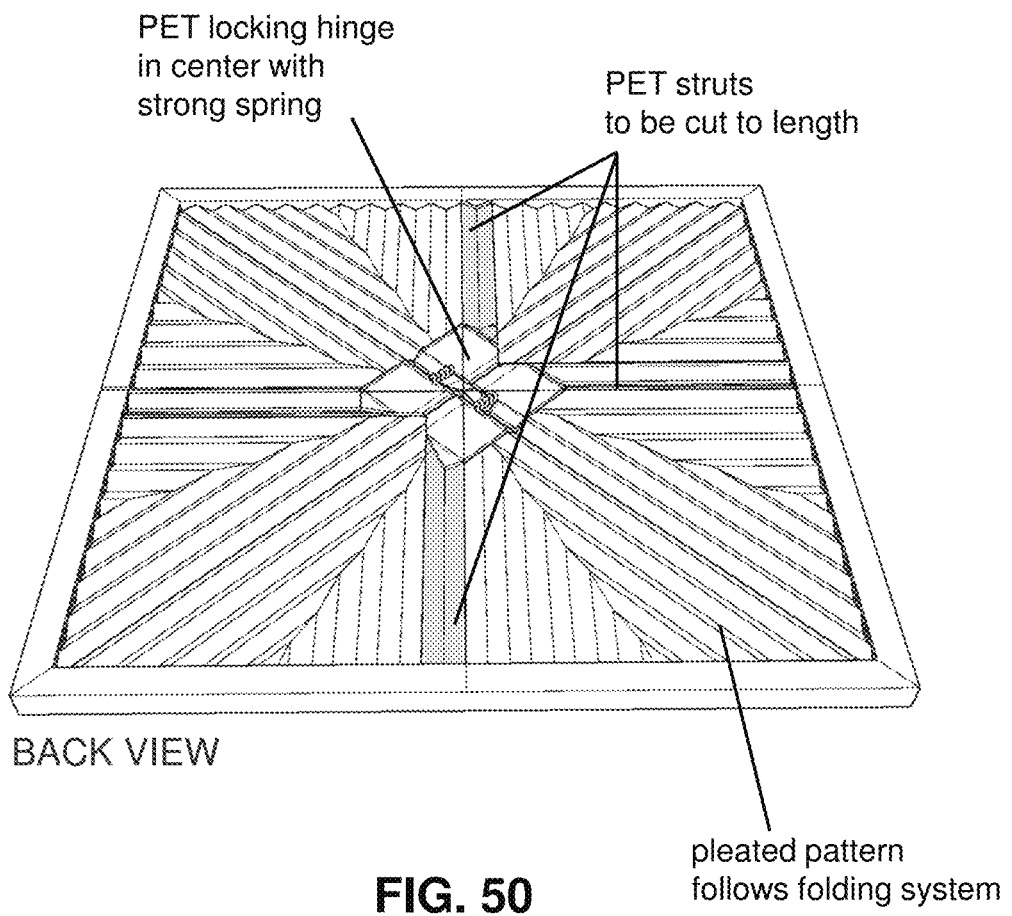

FIG. 50 shows a filter assembly, according to at least one embodiment.

Figure 51:
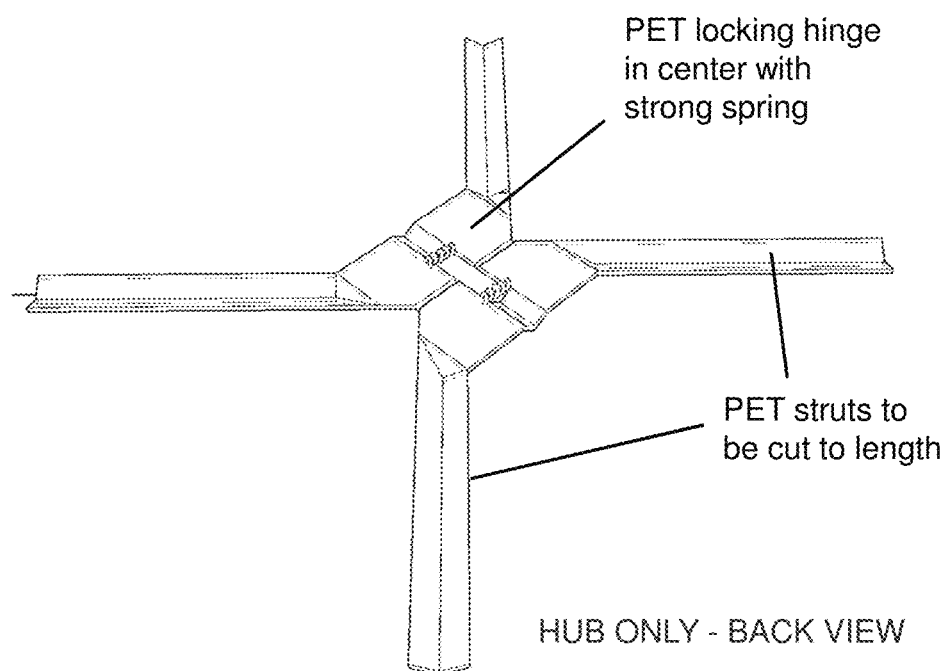

FIG. 51 shows a first side of the folding grate of FIG. 50, without a filter media element.

Figure 52:
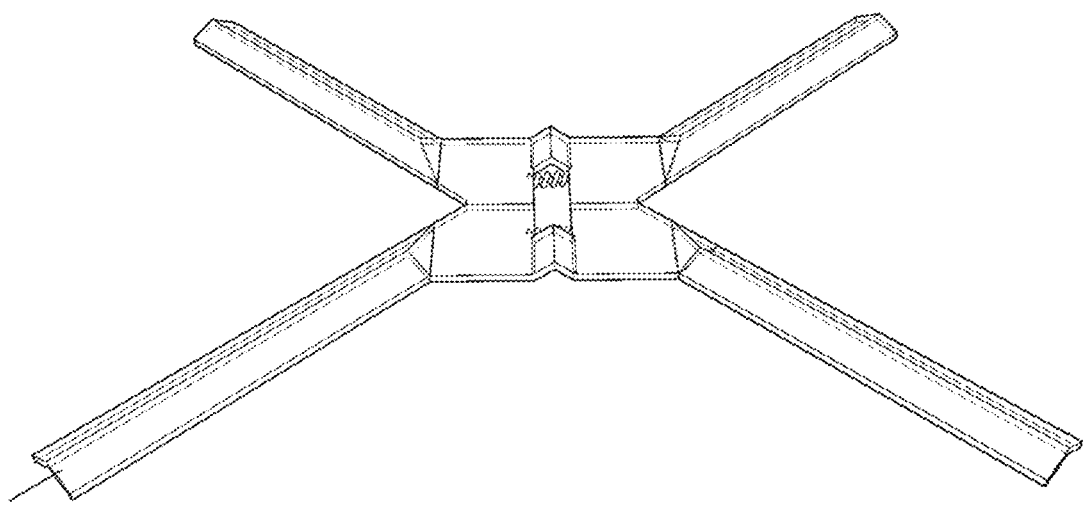

FIG. 52 shows a second side of the folding grate of FIG. 50.

Figure 53:
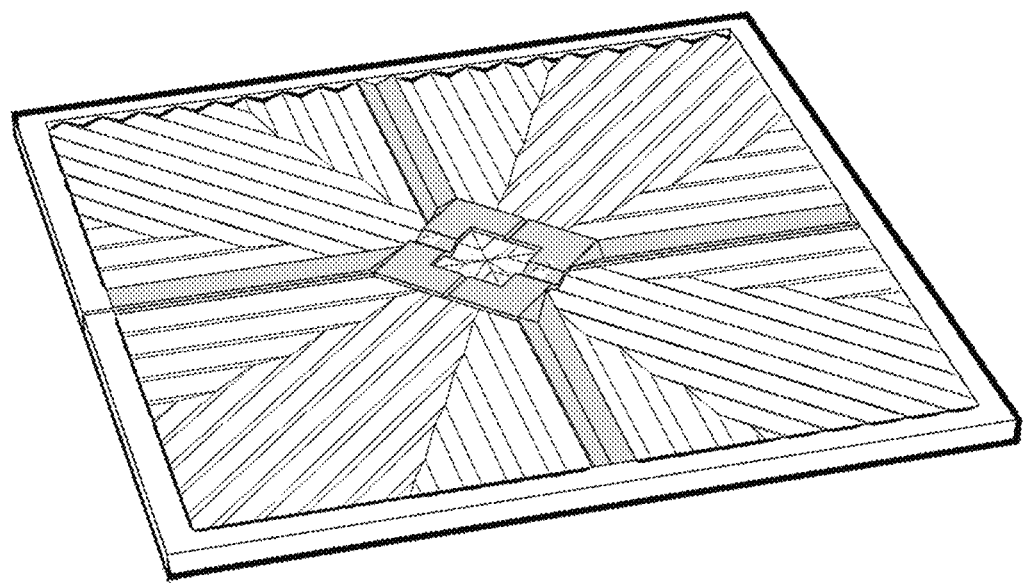

FIG. 53 shows an expandable filter element, according to at least one embodiment, in which a folding hub has an open central area.

Figure 54:
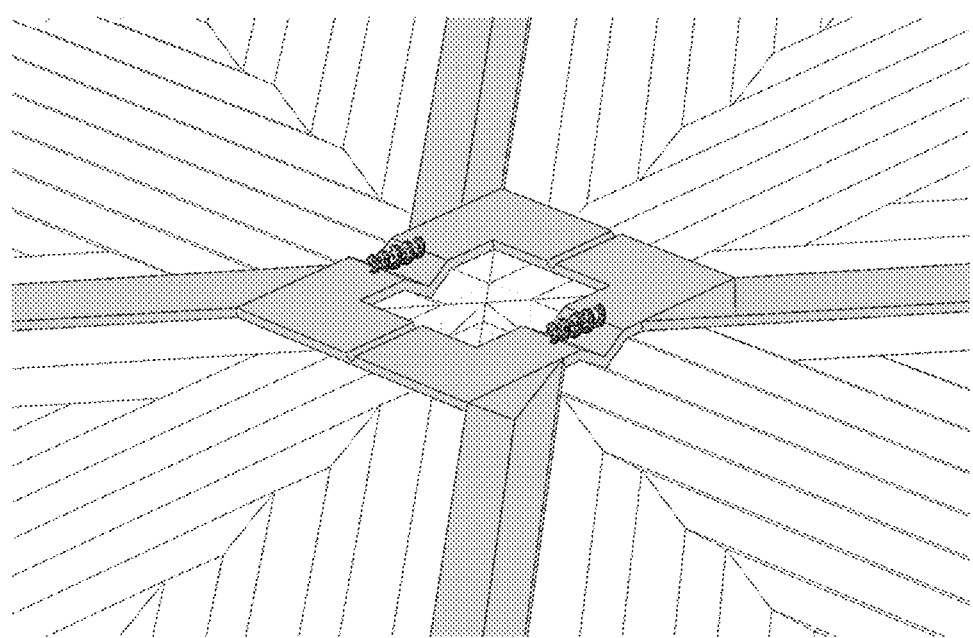

FIG. 54 is an enlarged view of a central portion of the filter element of FIG. 53.

Figure 55:
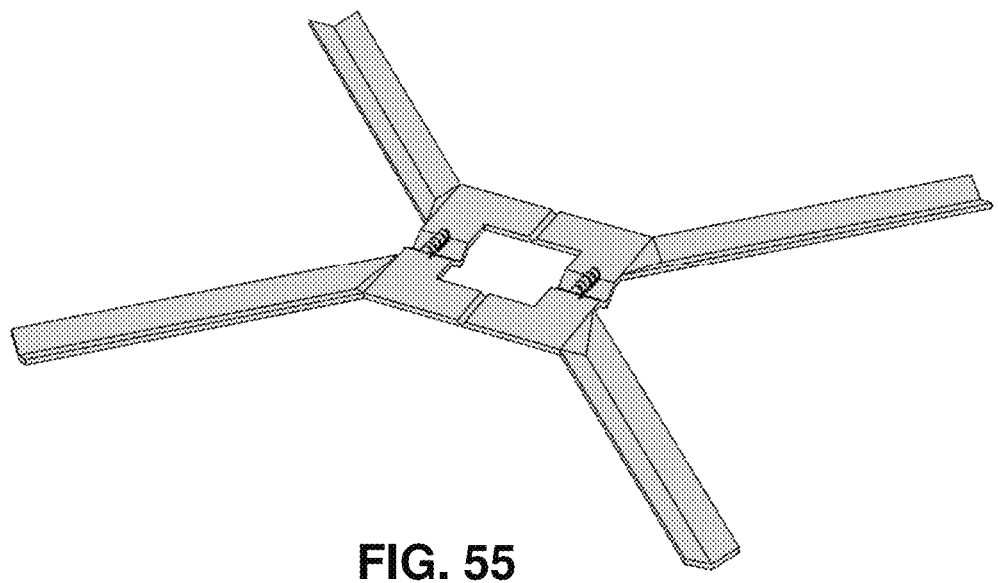

FIG. 55 shows the folding hub of FIG. 53 without a filter media element.

DETAILED DESCRIPTIONS

These descriptions are present particular embodiments with sufficient details to provide an understanding of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless described or implied as exclusive alternatives, features throughout the drawings and descriptions should be taken as cumulative, such that features expressly associated with some particular embodiments can be combined with other embodiments.

The drawings illustrate various embodiments of filter assemblies and their components including, for example, frames, filter elements supported along their outer edges by frames, and grates that span the areas defined between frame elements to further support the filter elements. The filter elements include filter media elements for filtering air passed therethrough. The filter media elements are generally porous and may be layered and may include woven and non-woven materials such as fabrics, piles, felts, and foams. The media elements may include materials that are spun bonded or molded. The media elements may include materials having antimicrobial properties. Other filter media materials and properties are within the scope of these descriptions. In some cases, the filter elements include sub-frames and various particular layers and edge treatments.

Throughout, some degree of size variability of the frames, filter elements, and other components is enabled by the drawings and descriptions. The descriptions describe features with reference to a filter plane, referring to a generally planar configuration or geometry of a filter assembly deployed and ready for use.

Figure 1A:
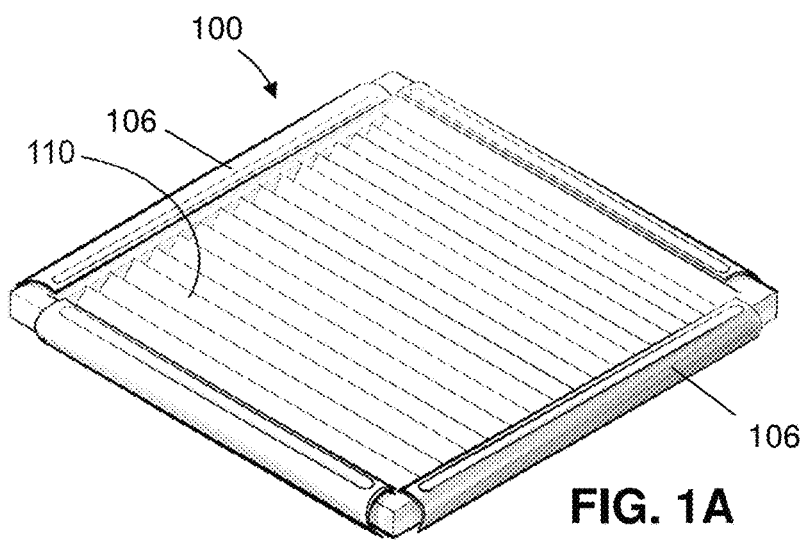
FIG. 1A shows a variable filter assembly according to at least one embodiment.
Figure 1B:
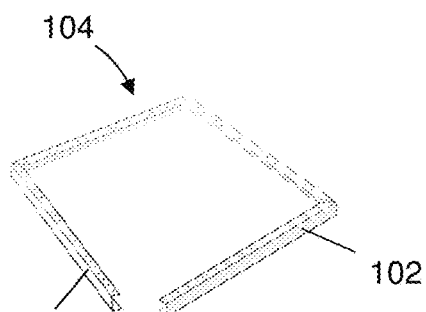
FIG. 1B shows a frame of the variable filter assembly of FIG. 1B as linear segments of a C-channel strip, according to at least one embodiment.
Figure 1C:
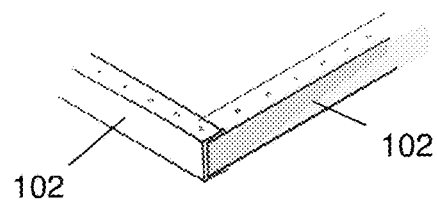
FIG. 1C shows terminal ends of the folded strip of FIG. 1B joined.
Figure 1D:
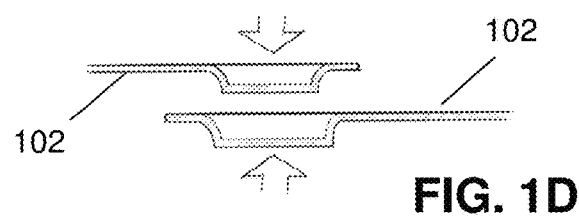
FIG. 1D shows holes formed in the strip joining and mutually engaging the terminal ends of FIG. 1C, according to at least one embodiment.
Figure 1E:
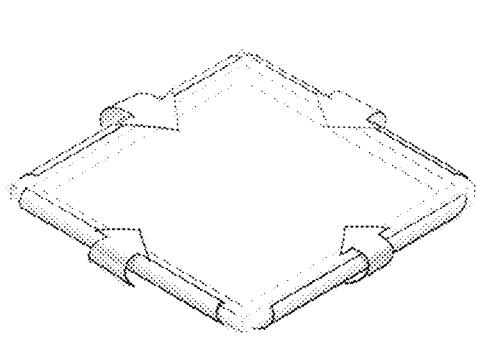
FIG. 1E shows edges of a filter media element wrapped partially around respective frame segments according to at least one embodiment.
Figure 1F:
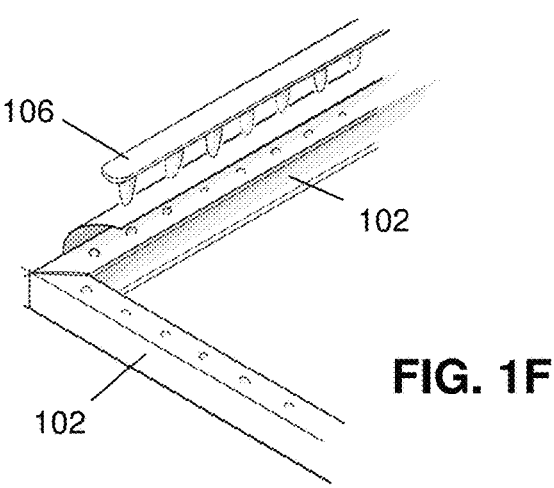
FIG. 1F shows the wrapped edges of the filter media element of FIGS. 1A and 1E secured by spike bars according to at least one embodiment.

FIG. 1A shows a variable filter assembly according to at least one embodiment having a frame termed herein as a "foldable simple frame." The assembly includes an expandable filter media element 110 supported by a peripheral frame 100 of linear segments arranged in a rectangular form in the filter plane. As shown in FIG. 1B, the linear segments 102 are formed by folding a C-channel strip 104, which is foldable anywhere along its length, at spaced fold locations according the dimensions desired. The terminal ends of the folded strip are then cut to length, to remove any excess strip material, and joined as shown in FIG. 1C. Holes formed along the strip facilitate measuring and folding to form segments, and facilitate joining the two end segments at their terminal ends as shown in FIG. 1D. As shown in FIGS. 1E and 1F, edges of the filter media element 110 can be wrapped partially around a respective peripheral frame segment 102 and secured thereto by a respective spike bar 106. Each spike bar 106 has spikes spaced equivalently as the holes in the C-channel strip 104 from which the linear frame segments 102 are formed.

Figure 2A:
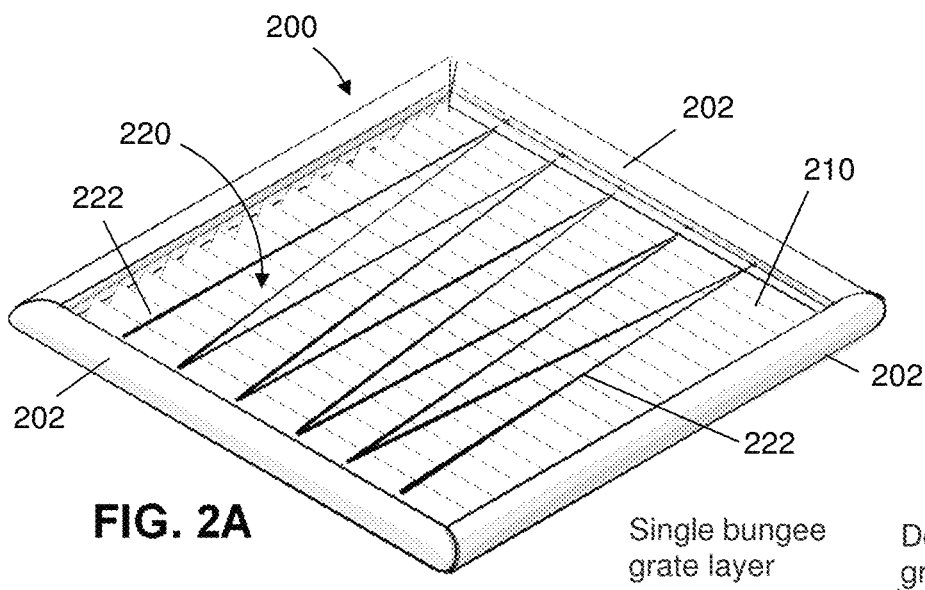
FIG. 2A shows a variable filter assembly according to at least one embodiment.
Figure 2B:
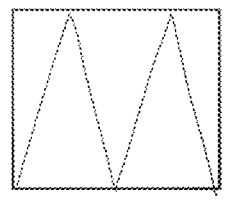
FIG. 2B shows a single elasticized cord grate layer, according to at least one embodiment.
Figure 2C:
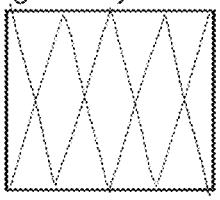
FIG. 2C shows a double elasticized cord grate layer according to at least one embodiment.
Figure 2D:
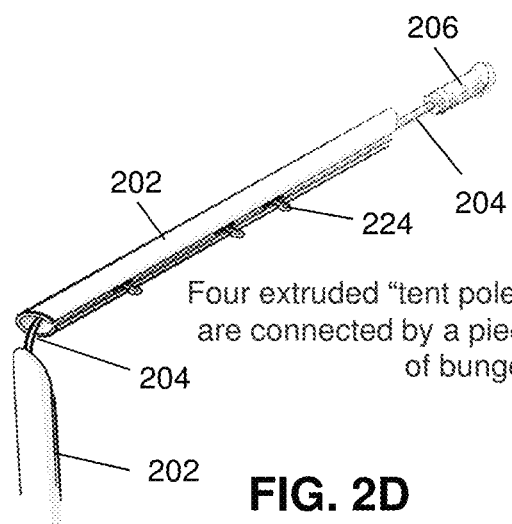
FIG. 2D shows pole segments of the frame of the filter assembly of FIG. 2A, according to at least one embodiment.
Figure 2E:
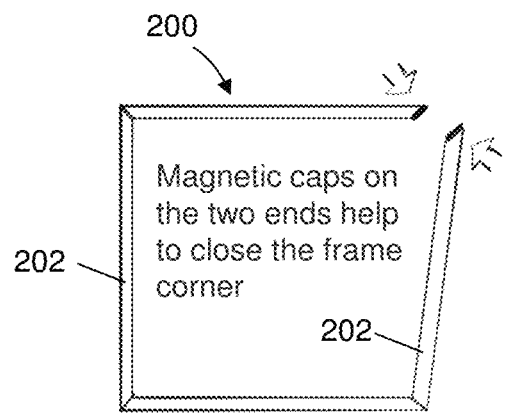
FIG. 2E the pole segments of FIG. 2D arranged in a rectangular form, according to at least one embodiment.
Figure 2F:
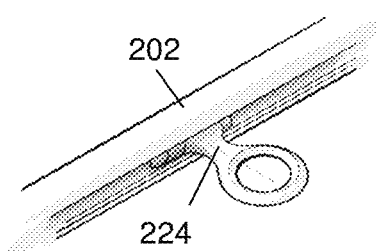
FIG. 2F shows a grate hook placed along a pole segment, according to at least one embodiment.
Figure 2G:
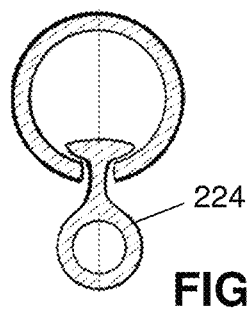
FIG. 2G is cross section of a pole segment and grate hook according to at least one embodiment.

FIG. 2A shows a variable filter assembly according to at least one embodiment having a frame 200 termed herein as a "pole frame." The assembly includes an expandable filter media element 210 supported by the peripheral frame 200, which has tubular pole segments 202 arranged in a rectangular form in the filter plane. The pole segments are joined by an internally captured shock cord 204 (FIG. 2D) having two opposing ends terminating at respective connectors 206, which may be magnetic. The shock cord can be an elasticized cord, such as a bungee cord, having elastic strands forming a core covered in a woven fibrous sheath, for example made of polypropylene or other natural or synthetic fibers. The frame is maintained in a rigid configuration by tension of the shock cord 204 when the pole segments are arranged in the rectangular form and the two connectors at the ends of the shock cord are joined as shown in FIG. 2E. Secondary shock cord segments 222 stretched across the filtration area of the expanded filter media element form an expandable grate 220. Grate hooks 224 through which the secondary shock cord segments are passed can slide along the pole segments as shown in FIG. 2F to vary the grate pattern. Each grate hook 224, as shown in FIG. 2G, has a bolt movably captured within a pole segment, a shank extending from the bolt through a longitudinal slit formed in the wall of the pole segment, and a loop or eye carried by the shank for engaging a shock cord segment.

Figure 3A:
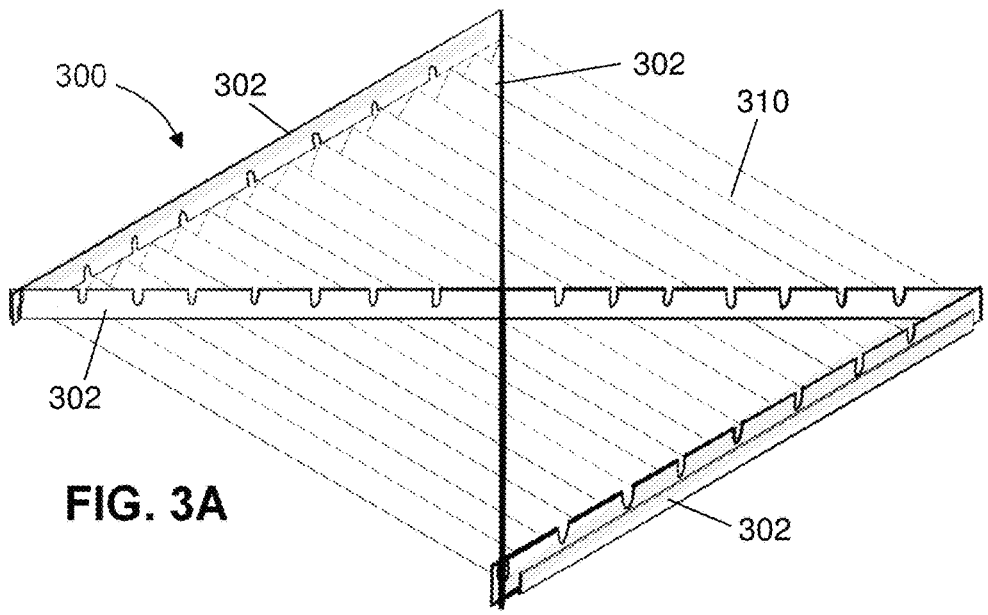
FIG. 3A shows a variable filter assembly according to at least one embodiment.
Figure 3B:
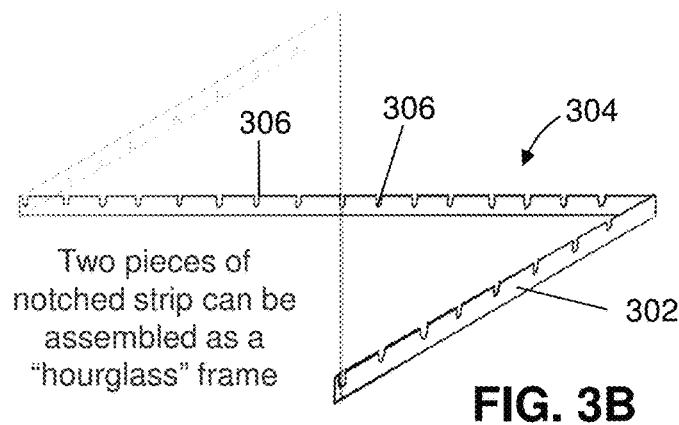
FIG. 3B shows a frame of the filter assembly of FIG. 3A, including crossed linear frame segments according to at least one embodiment.
Figure 3C:
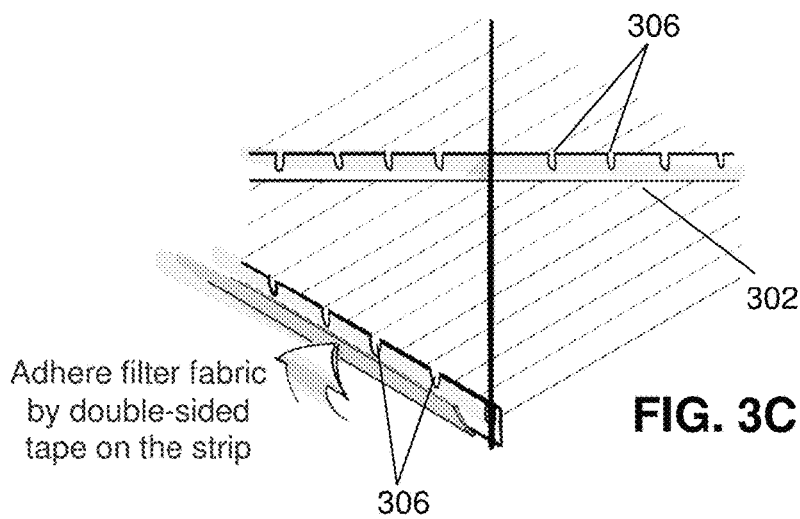
FIG. 3C shows the crossed frame segments engaged at their intersection according to at least one embodiment.

FIG. 3A shows a variable filter assembly according to at least one embodiment having a frame termed herein as a "box divider." The assembly includes an expandable filter media element 310 supported by a segmented frame 300 of linear frame segments 302 arranged as crossed in an hourglass form in the filter plane. The linear segments are formed by folding and segmenting a notched strip 304 (FIG. 3B) having spaced notches 306 along a longitudinal edge. The frame segments mutually engage when the slotted edge of one segment is brought into engagement with another where two notches align at the intersection of two frame segments as shown in FIG. 3C. The hourglass form is defined by two parallel outer frame segments and two inner frame segments crossing and intersecting at the center of the frame as shown in FIG. 3B. The filter media element can be expanded onto the frame with marginal portions of the filter media element adhered to the outer frame segments. Once assembled, the variable filter assembly has an overall outer rectangular form.

FIG. 4A shows a variable frame assembly 400 according to at least one embodiment termed herein as a "foldable frame." The assembly includes four linear L-channel segments 402 defining an outer rectangular form of variable dimensions. The linear segments are formed by bending or segmenting a primary strip 404 into four segments (FIG. 4C). The strip has a longitudinal crease or embossed line 408 that extends the length of the strip between its longitudinal edges to facilitate formation of the L-channel segments by 90 degree fold of each segment about the crease or embossed line 408 (FIG. 4C). The four corner junctions (FIG. 4D) of the segments are maintained by a corner clip 406 (FIG. 4E) at each corner. The variable frame assembly is useful to support or strengthen various filter assembly embodiments described herein.

FIG. 5A shows a frame assembly 500 according to at least one embodiment termed herein as a "modular frame with corner clips." The assembly includes four linear L-channel segments 502 (FIG. 5B) defining an outer rectangular form of variable dimensions in the filter plane. The linear segments are formed by bending or segmenting a primary strip 504 (FIGS. 5D-5E) into four segments. The strip 504 has a longitudinal crease or embossed line that extends the length of the strip between its longitudinal edges to facilitate formation of the L-channel segments by 90 degree fold of each segment at the crease or embossed line. The four corner junctions of the segments are maintained by a corner clip 506 (FIG. 5C) at each corner. The variable frame assembly is useful to support or strengthen various filter assembly embodiments described herein.

FIG. 6B shows a frame and grate assembly according to at least one embodiment, having a frame termed herein as a "collapsible frame." The assembly includes a frame 600 (FIG. 6A) having four linear L-channel segments 602, and four L-channel 90-degree bend corner pieces 606. The linear segments can variably overlap linear portions extending from the corner pieces to define an outer rectangular form of variable dimensions. Preformed holes in the L-channel faces corresponding to the filter plane are regularly spaced to as to align at incremental variable dimensions. A flexible tensile cord 620, such as a shock cord, is laced through the holes forming a grate across the area within the frame in the filter plane. The cord, passing through aligned respective holes of overlapping portions of the linear-segment and corner-piece frame elements, maintains engagement of the linear segments and corner pieces at desired dimensions of the frame. The frame 600 in FIG. 6B is reduced in a first direction relative to the expanded state of FIG. 6A. The frame 600 in FIG. 6C is further reduced in a second direction perpendicular to the first direction.

FIG. 7A shows a frame and grate assembly 700 according to at least one embodiment, termed herein as a "collapsible frame+grid." The assembly 700 includes four corner area pieces 706 and multiple edge area pieces 702 arranged according to desired outer rectangular dimensions. Each of the corner area pieces and edge area pieces has peripheral L-channel frame segments and additional frame arms extending therefrom in the filter plane to together define a grate. Three configurations are shown by varying the overlapping arrangement of corner area and edge area pieces. In the largest of the configurations shown, a central grid section 720 is installed in the filter plane between edge area pieces. The frame 700 in FIG. 7B is reduced in a first direction relative to the expanded state of FIG. 7A. The frame 700 in FIG. 7C is further reduced in a second direction perpendicular to the first direction.

FIG. 8A shows a frame 400, for example as shown in FIG. 4A, and a grate assembly 820 according to at least one embodiment, termed herein as a "grid roll." The grate assembly includes multiple parallel grate arms 822 (FIG. 8C) each having, at each end thereof, a tooth 824 for piercing the filter plane portions of the frame segments. The grate arms are interconnected and regularly spaced along a cord 826, which may be inextensible or may be of variable length such as a shock cord. The grate arms can be conveniently rolled (FIG. 8D) into a bundle for shipping and storage. The grate assembly 820 (FIGS. 8A-8B) can also be used with frames (FIGS. 4A and 5A for example) where holes to accommodate the teeth are to be formed by piercing frame segments, and used with frames (for example FIG. 6A) where holes are already formed in the frame in the filter plane.

FIG. 9A shows a frame 400, for example as shown in FIG. 4A, and a grate assembly 920 according to at least one embodiment, termed herein as a "fold & snap grate." The grate assembly 920 includes multiple grate arms 922 each having, at each end thereof, a tooth 908 for piercing or engaging the filter plane portions of the frame segments. As shown in FIG. 9B, each grate arm is formed from a strip 904 have regularly spaced notches 906 where the strip can be terminated or folded. The teeth extending from the grate arm are the two inter-notch sections of the strip at its ends folded to 90 degrees. Each tooth can be passed through the frame segment and folded flat to secure the ends of each grate arm. The grate assembly 920 can also be used with frames (FIGS. 4A and 5A for example) where holes to accommodate the teeth are to be formed by piercing frame segments and used with frames (for example FIG. 6A where holes are already formed in the frame in the filter plane.

FIG. 10A shows a variable filter assembly according to at least one embodiment having a filter media element 1010 termed herein as a "magnetic fold up filter." The expandable filter media element is supported by a peripheral frame 1000 of linear segments arranged in a rectangular form in the filter plane. The frame segments and filter media element are engaged by magnetic attraction (FIG. 10E), in at least one embodiment. The filter media element 1010 can be collapsed along parallel accordion fold lines 1012 (FIG. 10B), and, then halved in length by bending as shown in FIG. 10C at the center of the accordion folded configuration for a twice-kind folded configuration for shipping and storage in a reduced shipping size or state as shown in FIG. 10D.

FIG. 11E shows a filter assembly according to at least one embodiment having a filter media element termed herein as a "magnetic foldable filter." The frame (FIG. 11D) includes four linear L-channel segments joined by four corner clips. The filter media element (FIGS. 11A-11C) includes multiple panels joined together by creases or fold lines parallel to the edges of the rectangular filter media element. Thus the filter media element can be folded along crease lines extending in two dimensions so as to be map folded or otherwise reduced to a minimized configuration (see "ship size" of FIG. 11A) convenient for shipping and storage. Magnetic strips along the outer edges of the filter media element engage the frame, which also has magnets or other appropriate material for magnetic attachment. The frame may have one (FIG. 11D) or more grate arms spanning between opposing outer frame segments so as to form a grate to support the filter media element.

Figure 12A:
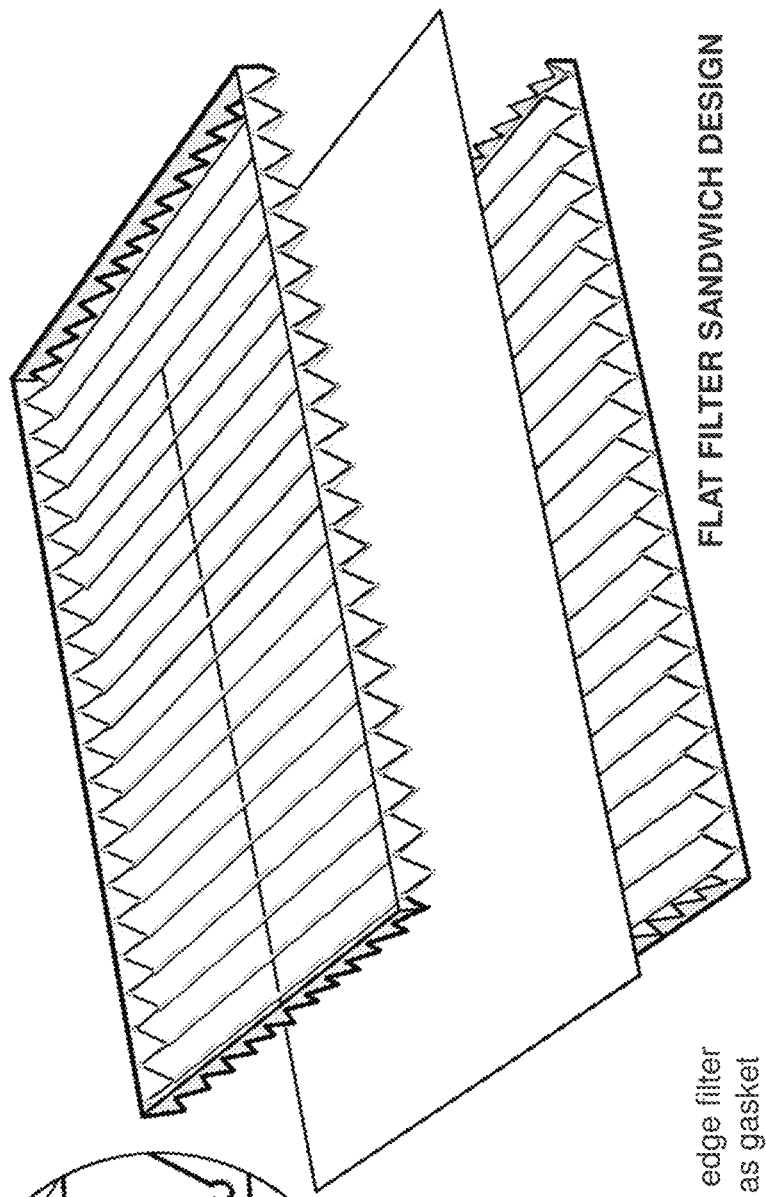
FIG. 12A is an exploded perspective view of a filter assembly according to at least one embodiment.
Figure 12B:
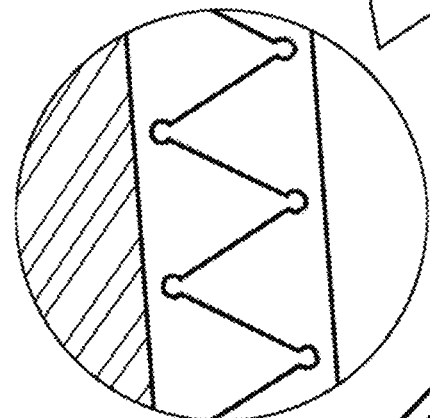
FIG. 12B shows interlocking teeth frame sections along an edge portion of the filter assembly of FIG. 12A.
Figure 12C:
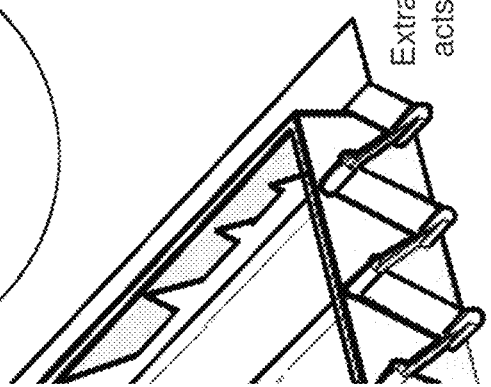
FIG. 12C is an enlarged perspective view of a corner portion of the filter assembly of FIG. 12A.

FIG. 12A shows a filter assembly according to at least one embodiment termed herein as a "flat filter sandwich design." A flexible and foldable filter media element is captured between interlocking teeth of two rectangular frame sections. As shown in FIG. 12C, extra edge portions of the filter media element, serving as a flexible outer gasket, extend outward from the sides of the frame formed when the two frame sections are engaged by their interlocking teeth (FIG. 12B).

Figure 13D:
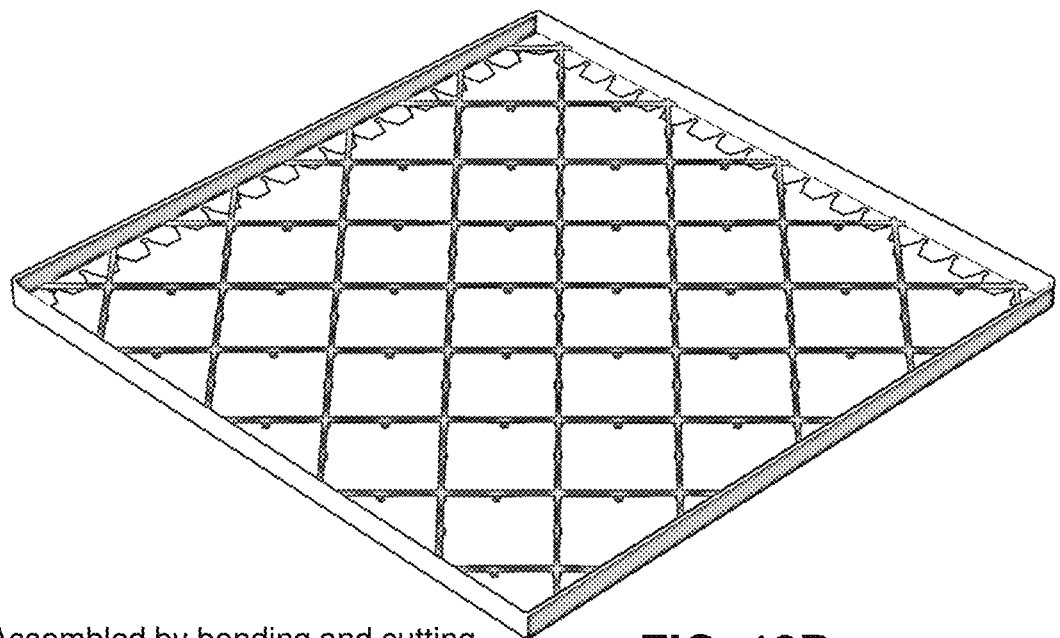
FIG. 13D shows a variable frame and grate assembly according to at least one embodiment.
Figure 13E:
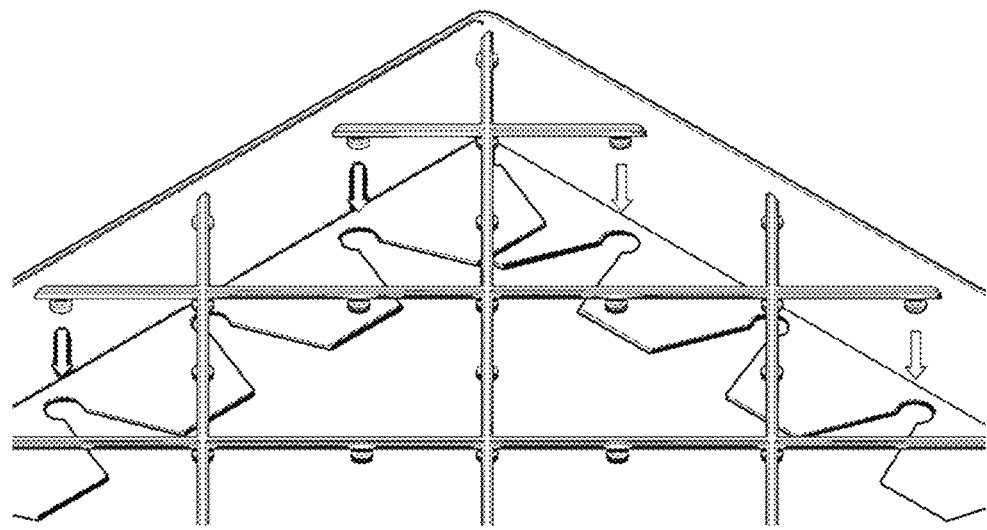
FIG. 13E shows a corner portion of the variable frame and grate assembly of FIG. 13D.

FIGS. 13A-13C show a variable frame and grate assembly according to at least one embodiment termed herein as a "foldable frame snap in grid." The assembly includes a peripheral frame of linear segments arranged in a rectangular form in the filter plane. The linear segments are formed by folding an L-channel strip, which is foldable at spaced notches formed in the filter plane face of the strip. The notches are wedge shaped, having a wide mouth and narrowing inward toward a hole that retains knobbed posts of a snap-in mesh or grid that forms a grate when installed. The notches and posts are equivalently spaced so as to align and permit variable sizing. Any excess of the frame strip can be cut free of the rectangular form, and the mesh or grid is cut or preformed to the desired dimensions. The engagement of the posts along the outer edges of the mesh with the holes in the frame segments maintains the assembly in any final desired dimensions and configuration. Various filter media elements can be installed or used with the assembly of FIGS. 13A-13C, with support across the filter plane by the grate.

Figure 14:
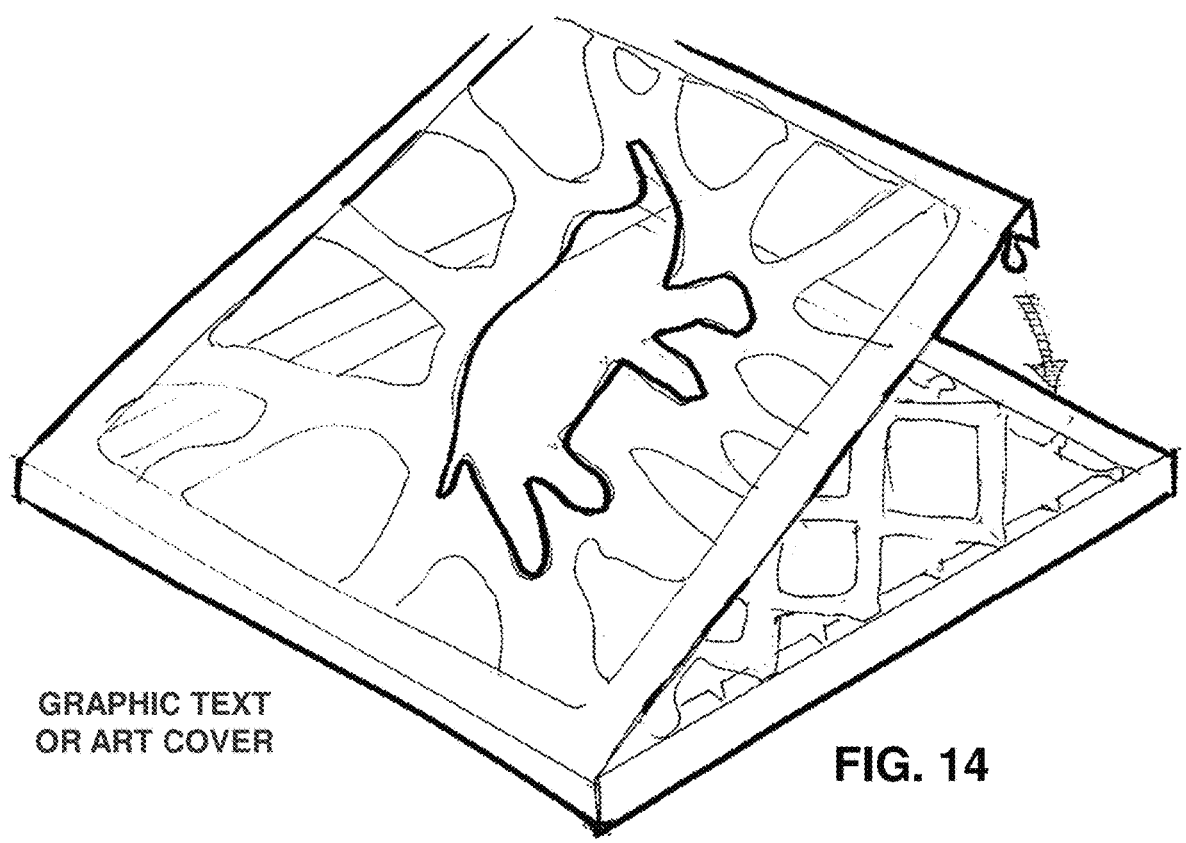
FIG. 14 shows a cover for a filter assembly, according to at least one embodiment.

FIG. 14 shows a cover for a filter assembly, the cover having a logo or other graphic for aesthetic purpose according to at least one embodiment. The cover may, for example, have cutout areas so as to serve as a grate to support a filter media element. In the illustrated embodiment, an elephant logo or graphic is represented. Other graphic illustrations, logos, and artworks are within the scope of these descriptions.

Figure 15A:
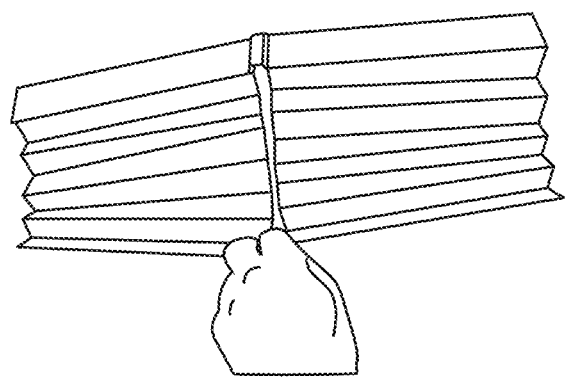
FIG. 15A shows an expandable filter media element, according to at least one embodiment, in a first configuration.
Figure 15B:
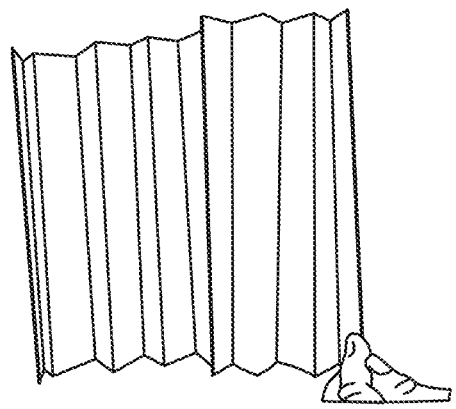
FIG. 15B shows the expandable filter media element of FIG. 15A in a second configuration.
Figure 15C:
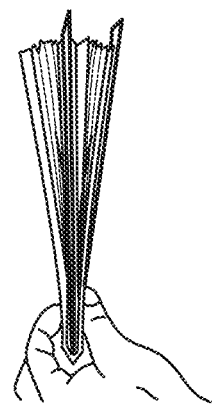
FIG. 15C shows the expandable filter media element of FIG. 15A in a third configuration.

FIGS. 15A-15C show an expandable filter media element, according to at least one embodiment, in three configurations. The filter media element has a pair of panels that can each be folded along parallel accordion fold lines to collapse the filter media element in one of two filter plane dimensions. The two panels are joined by an edge strip having a central crease or fold line facilitating the bending of the edge strip so as to halve the filter media element in length thus further reducing the filter media element in the second of the two filter plane dimensions. Thus, the expandable filter media element can be reduced to a collapsed and folded configuration for shipping and storage.

Figure 16A:
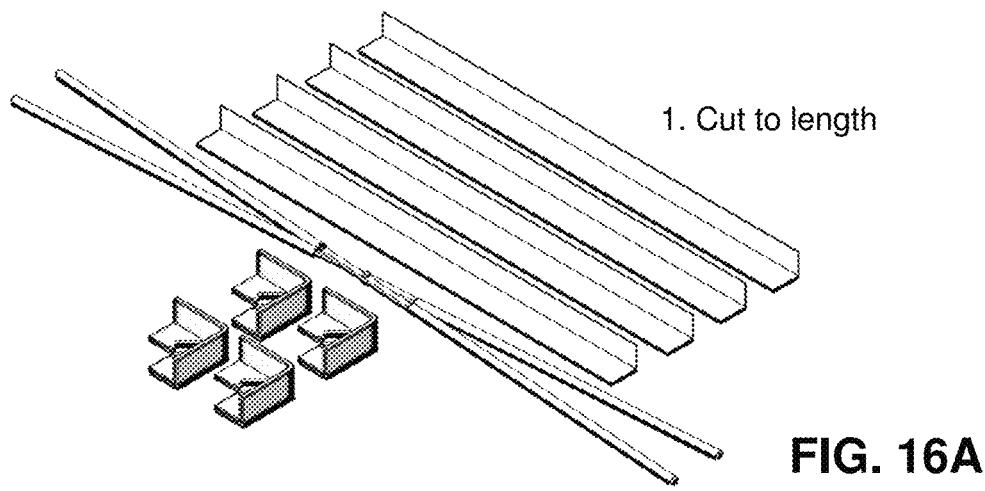
FIG. 16A shows components an unassembled frame assembly, according to at least one embodiment.
Figure 16B:
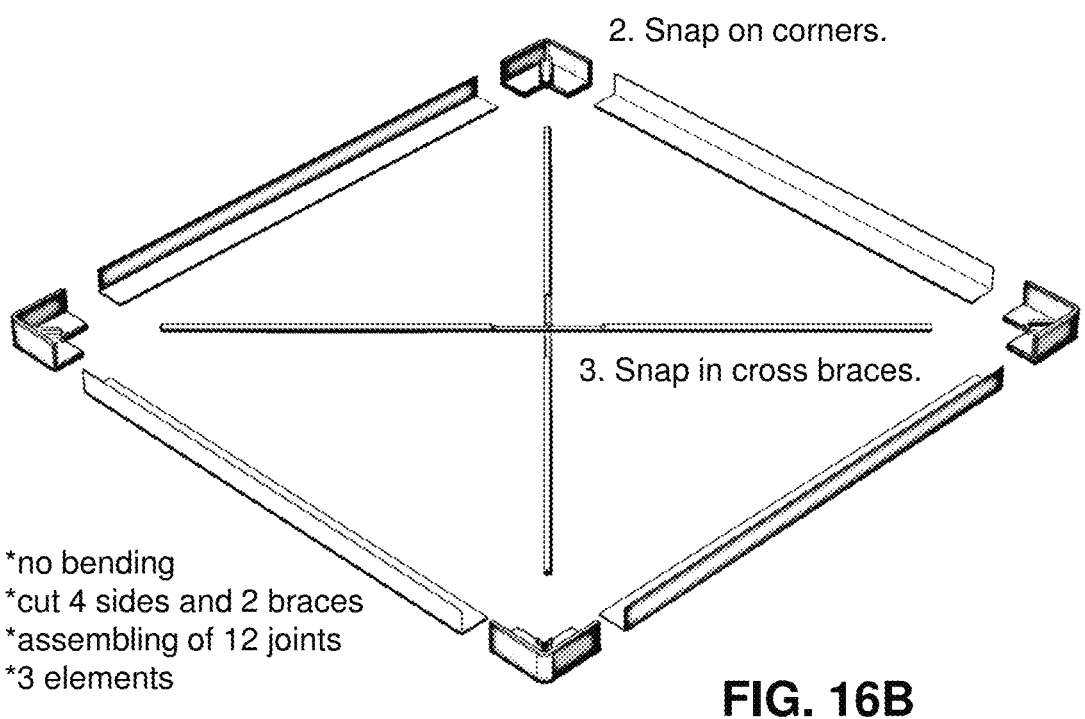
FIG. 16B shows the components of FIG. 16a positioned for assembly.

FIGS. 16A-16B show a frame assembly according to at least one embodiment termed herein as a "linear frame–straight+corners." The assembly includes four linear L-channel segments defining an outer rectangular form of variable dimensions in the filter plane according to the lengths of the segments. The four corner junctions of the segments are maintained by a corner clip at each corner. Two diagonal inner frame segments, serving as a grate to support a filter media element, cross and intersect at the center of the frame. Each inner frame segment spans the interior area of the frame between diagonally opposing corners. The inner frame segments snap into place, with a joint at their centers at which they are engaged. The frame segments are partially rotatable relative to each other at the joint permitting the joined inner frame segments to be placed in an almost parallel reduced configuration for shipping and storage. The variable frame assembly is useful to support or strengthen various filter assembly embodiments described herein.

Figure 17:
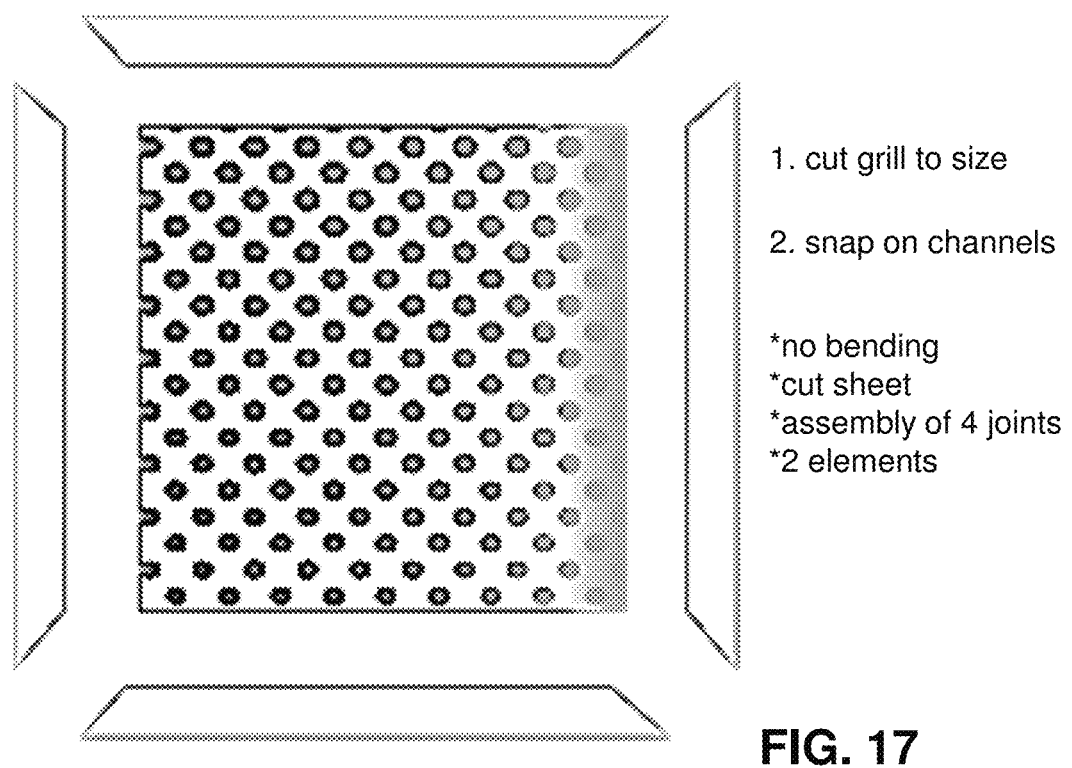
FIG. 17 shows a filter assembly according to at least one embodiment.

FIG. 17 shows a variable frame and grate or filter assembly according to at least one embodiment termed herein as a "planar frame." The assembly includes a filter plane element supported by a peripheral frame of linear segments arranged in a rectangular form. The illustrated filter plane element can represent a grate, a filter assembly, and both among other examples. The frame segments are angle cut, for example at 45 degrees, at their ends to define abutting corner joints.

Figure 18A:
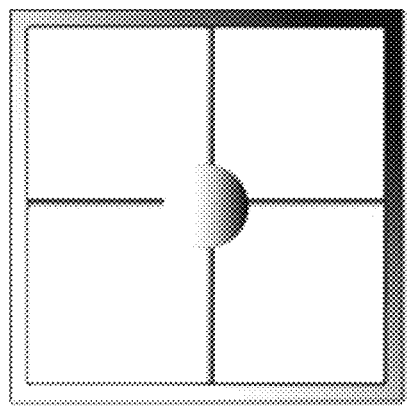
FIG. 18A shows a frame with cross arms according to at least one embodiment.
Figure 18B:
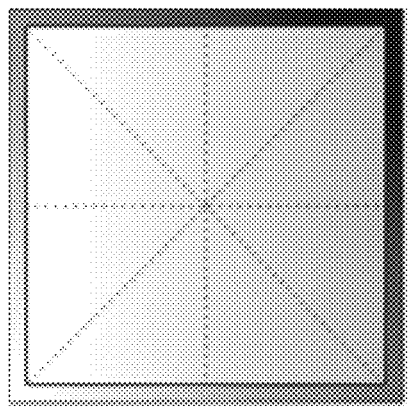
FIG. 18B shows a filter media element according to at least one embodiment.
Figure 18C:
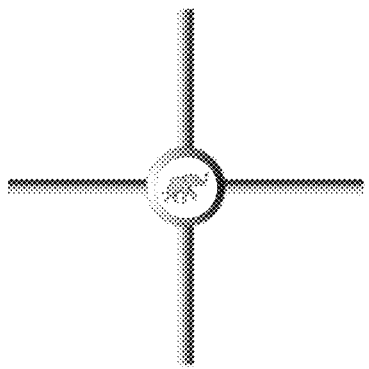
FIG. 18C shows a filter assembly including the frame of FIG. 18A and filter media element of FIG. 18B, according to at least one embodiment.

FIGS. 18A-18C show a filter assembly according to at least one embodiment. A filter media element (FIG. 18B) having a rectangular periphery is supported by a removable grate having four arms extending outwards from a central hub, on which a logo or other graphic is shown in FIG. 18C.

Figure 19:
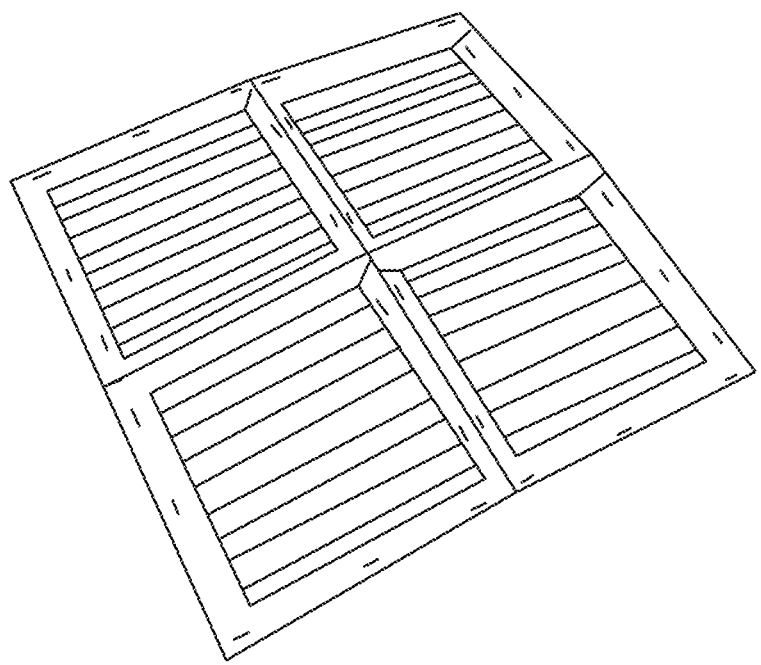
FIG. 19 shows a filter assembly, according to at least one embodiment, in an expanded rectangular configuration.
Figure 20A:
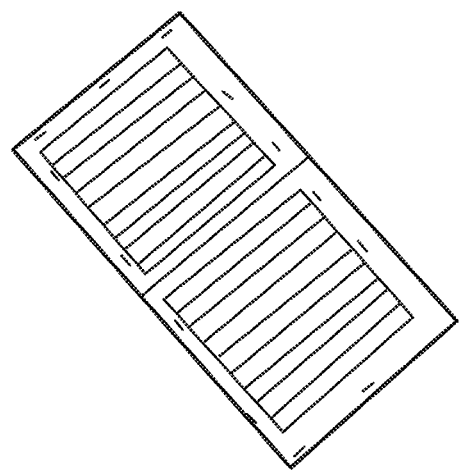
FIG. 20A shows the filter assembly of FIG. 19, in a once-folded configuration.
Figure 20B:
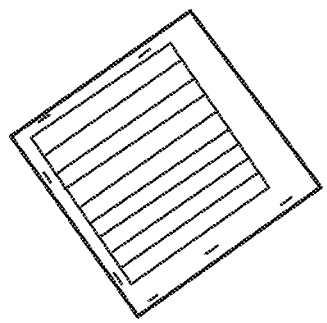
FIG. 20B shows the filter assembly of FIG. 19, in a twice-folded configuration.
Figure 20C:
FIG. 20C shows the filter assembly of FIG. 20B, in a package for shipping or storage.

FIGS. 19-20C show a filter assembly, according to at least one embodiment, which can be twice folded from an expanded rectangular configuration to a reduced configuration convenient for shipping and storage. The filter assembly includes a filter media element supported by a rectangular peripheral frame of foldable linear segments and a grate defined by a grid of arms crossing the rectangular interior defined within the peripheral frame.

The filter media element of FIGS. 19-20D, and various other filter assemblies and media elements illustrated in the drawings and described herein, may have a layered filter medium using an undulating non-woven pile layer and a supporting grid fiber layer.

Figure 21A:
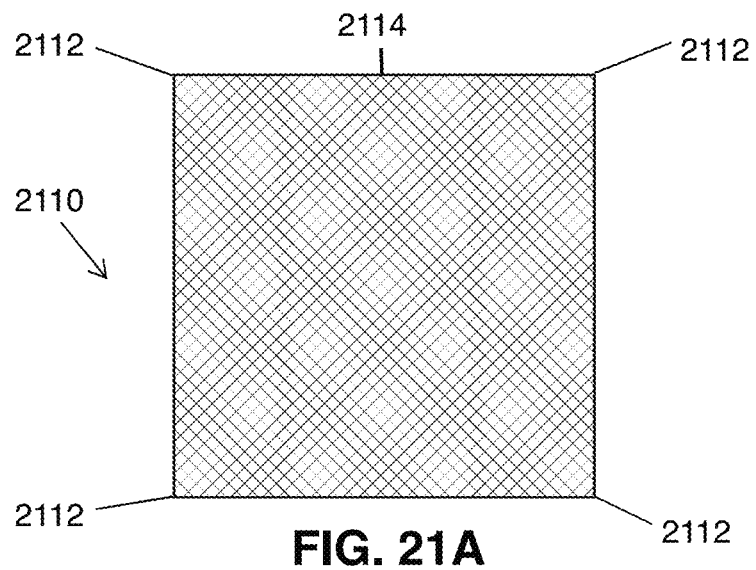
FIG. 21A shows a foldable filter media element, according to at least one embodiment.
Figure 21B:
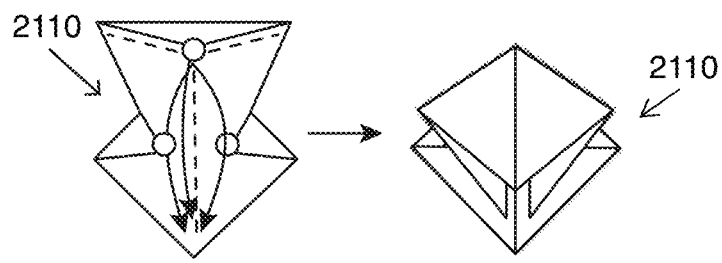
FIG. 21B shows the filter media element of FIG. 21A in transition to a folded reduced state.
Figure 21C:
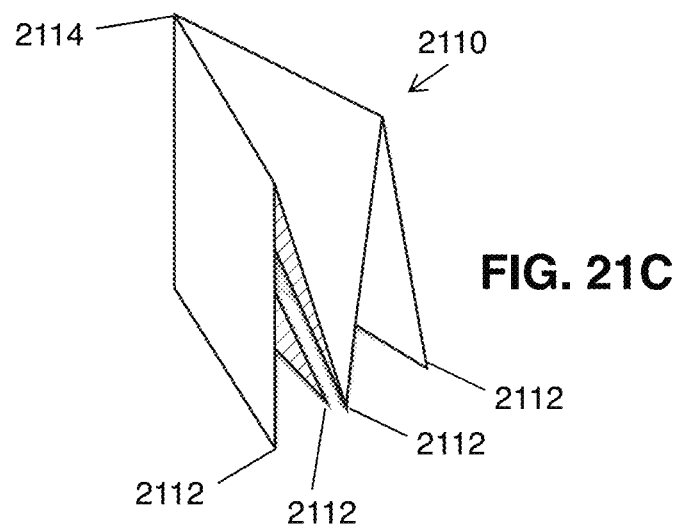
FIG. 21C shows the filter media element of FIG. 21A in a folded reduced state.

FIGS. 21A-21C show a foldable filter media element 2110, according to at least one embodiment, in an expanded state. A pattern of crease or fold lines facilitate folding of the media element from the expanded configuration (FIG. 21A) to a reduced configuration (FIG. 2C) convenient for shipping and storage. The reduced configuration has an area that is one fourth in size relative to the expanded configuration in the filter plane. The particularly illustrated fold pattern is termed herein an "origami crane fold." Avantageously, the four outer corners 2112 of the expanded configuration are brought together in the reduced configuration at a location diagonally across the reduced configuration from the center 2114 of the media element, which occupies an opposite corner of the reduced configuration.

Figure 22A:
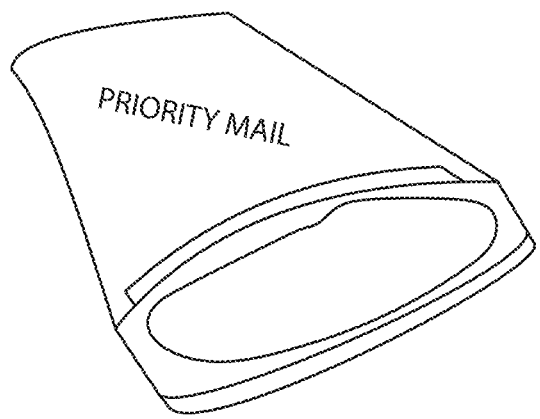
FIG. 22A is a shipping or storage package for use with a filter media element, according to at least one embodiment.
Figure 22B:
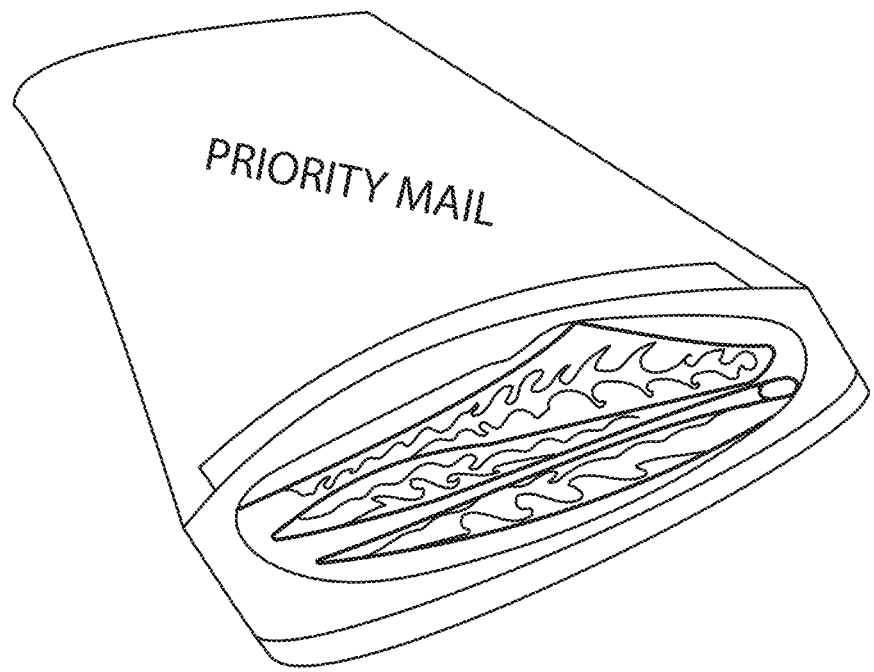
FIG. 22B is the package of FIG. 22B with a filter media element placed inside, according to at least one embodiment.

FIG. 22A is a shipping or storage package into which a filter media element, according to at least one embodiment, can be placed in a reduced configuration as shown in FIG. 22B. The filter media element for example may be that of FIGS. 21A-21C or others according to various embodiments. The package shown in FIGS. 22A-22B is a soft-walled envelope or bag having a sealing flap shown as open.

Figure 23:
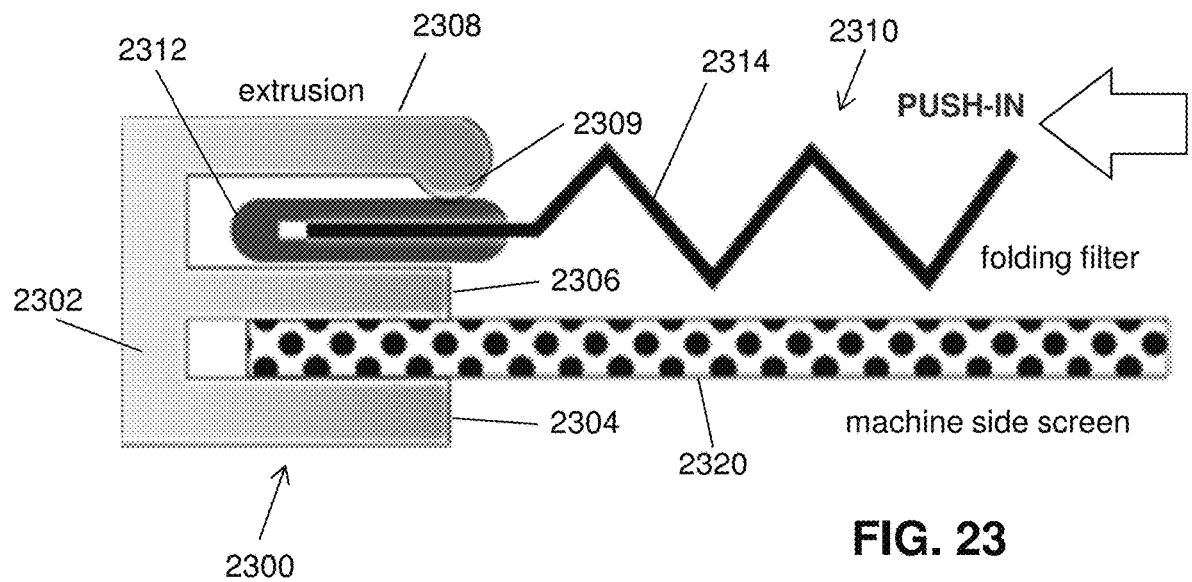
FIG. 23 is a side view of an edge portion of a filter assembly according to at least one embodiment.

In the filter assembly according to FIG. 23, a peripheral frame segment 2300 serves as a clip retaining a screen 2320 and an expandable replaceable filter element 2310. The frame segment may, for example, be an extruded strip segment. In cross-sectional view, the frame segment has an outer edge wall 2302 and three inward extending strips between which two slots are formed for respectively retaining the screen and filter. The screen is retained in a first slot defined between a lower strip 2304 and a central strip 2306. The filter element is retained in a second slot defined between the central strip and an upper strip 2308. A downward extending bead 2309 along the lower face of the inward edge of the upper strip helps to retain the filter element. The filter element 2310 has an accordion folding filter medium 2314 and an edge cuff 2312 in which a peripheral edge of the filter medium is captured. The filter element is retained along the frame segment by engagement of the edge cuff 2312 within the second slot and with the bead 2309.

Figure 24:
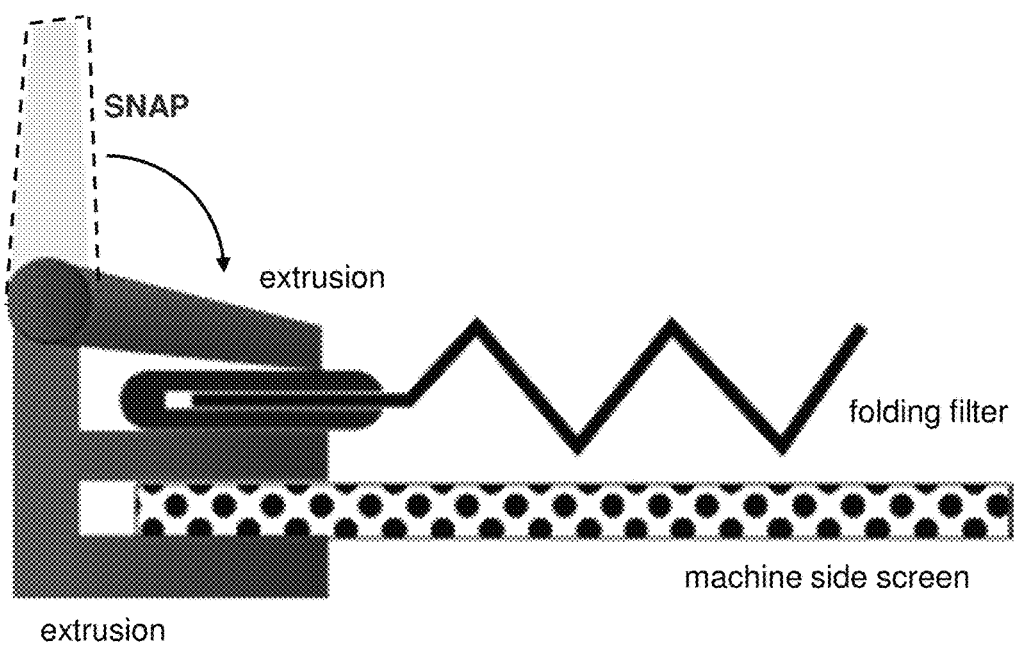
FIG. 24 is a side view of an edge portion of a filter assembly according to at least one embodiment.

In the filter assembly according to FIG. 24, a peripheral frame segment serves as a clip retaining a screen and an expandable replaceable filter element. The frame segment may, for example, be formed of extruded strip segments. In cross-sectional view the frame segment has an outer edge wall and three inward extending strips between which two slots are formed for respectively retaining a screen and a filter element. The screen is retained in a first slot defined between a fixed lower strip and a fixed central strip. The filter element is retained in a second slot defined between the central strip and a folding upper strip. The upper strip is connected to the edge wall by a hinge allowing the second slot to open to receive the filter element and close upon the filter element for retention. The filter element has an accordion folding filter medium and an edge cuff in which a peripheral edge of the filter medium is captured. The filter element is retained along the frame segment by engagement of the edge cuff within the second slot and with the folding upper strip.

Figure 25:
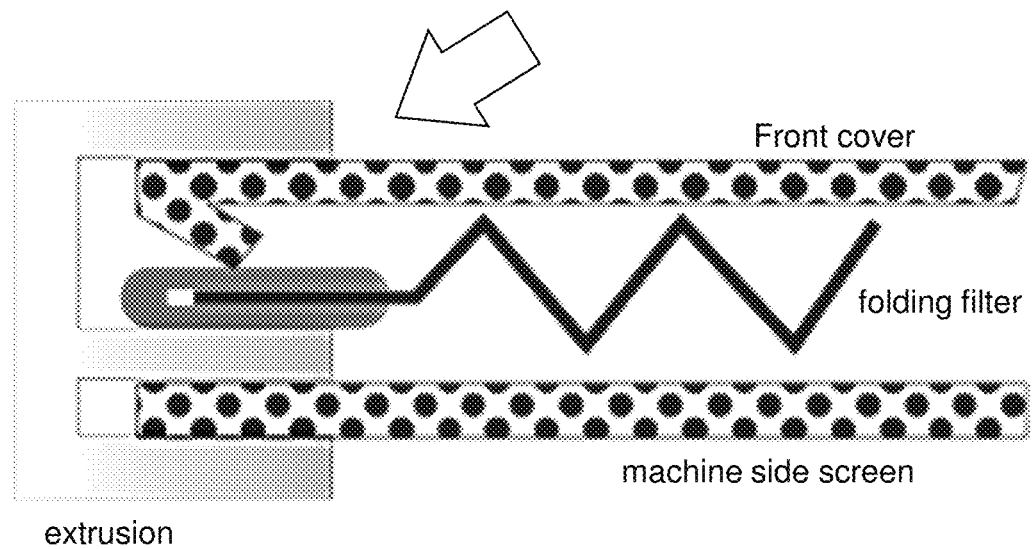
FIG. 25 is a side view of an edge portion of a filter assembly according to at least one embodiment.

In the filter assembly according to FIG. 25, a peripheral frame segment serves as a clip retaining an expandable replaceable filter element between front and back screens. The frame segment may, for example, be an extruded strip segment. In cross-sectional view the frame segment has an outer edge wall and three inward extending strips between which two slots are formed for retaining the screens and filter element. The back screen is retained in a first slot defined between a lower strip and a central strip. The filter element and front screen are retained in a second slot defined between the central strip and an upper strip. An inward barb-like fold along the edge of the front screen helps to retain the filter element. The filter element has an accordion folding filter medium and an edge cuff in which a peripheral edge of the filter medium is captured. The filter element is retained along the frame segment by engagement of the edge cuff within the second slot and with the barb-like fold of the upper screen.

Figure 26:
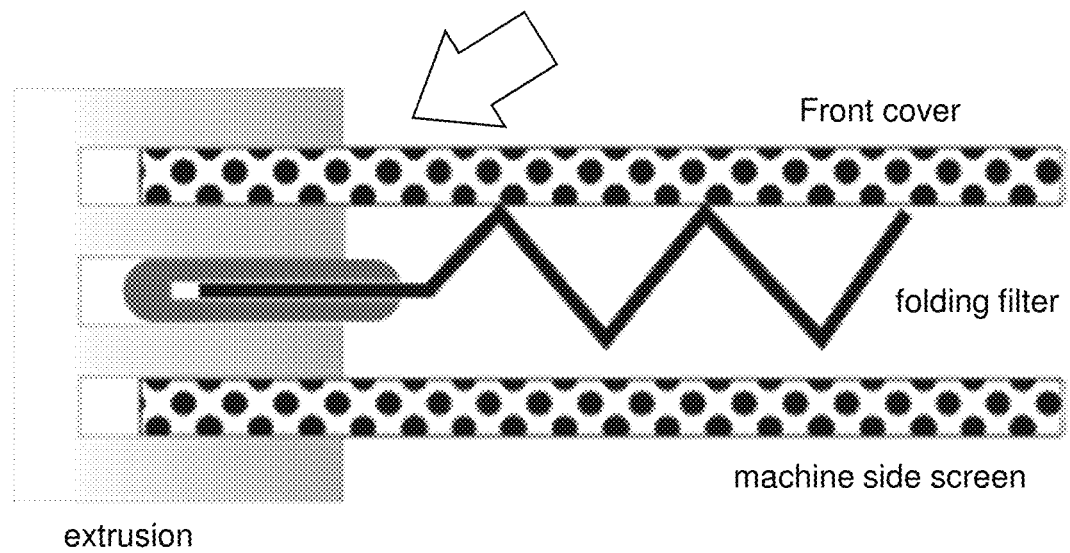
FIG. 26 is a side view of an edge portion of a filter assembly according to at least one embodiment.

In the filter assembly according to FIG. 26, a peripheral frame segment serves as a clip retaining an expandable replaceable filter element between front and back screens. The frame segment may, for example, be an extruded strip segment. In cross-sectional view the frame segment has an outer edge wall and four inward extending strips between which three slots are defined. A back slot, a central slot, and a front slot are defined for respectively retaining the back screen, filter element, and front screen. The filter element has an accordion folding filter medium and an edge cuff in which a peripheral edge of the filter medium is captured. The filter element is retained along the frame segment by engagement of the edge cuff within the central slot.

Figure 27:
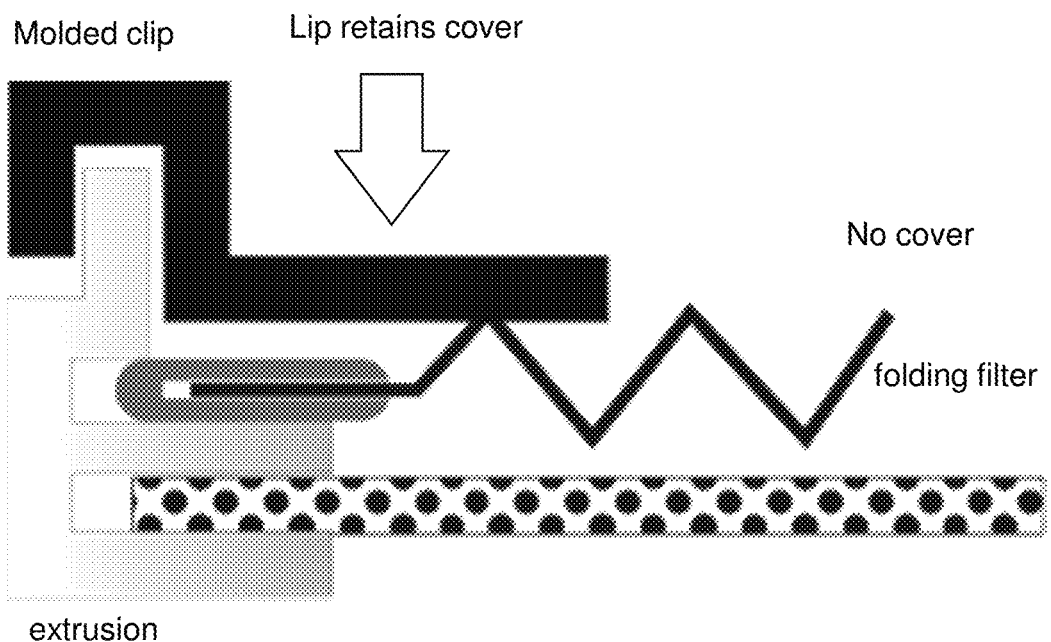
FIG. 27 is a side view of an edge portion of a filter assembly according to at least one embodiment.

In the filter assembly according to FIG. 27, a peripheral frame segment serves as a clip retaining a screen and an expandable replaceable filter element. The frame segment may, for example, be an extruded strip segment. In cross-sectional view the frame segment has an outer edge wall and three inward extending strips between which two slots are formed for respectively retaining the screen and filter element. The screen is retained in a first slot defined between a lower strip and a central strip. The filter element is retained in a second slot defined between the central strip and an upper L-shaped strip. A bezel clip mounts onto an upper extending arm of the L-shaped strip and further engages to retain the filter element. The filter element has an accordion folding filter medium and an edge cuff in which a peripheral edge of the filter medium is captured. The filter element is retained along the frame segment and bezel clip by engagement of the edge cuff within the second slot and with the bezel clip.

Figure 28:
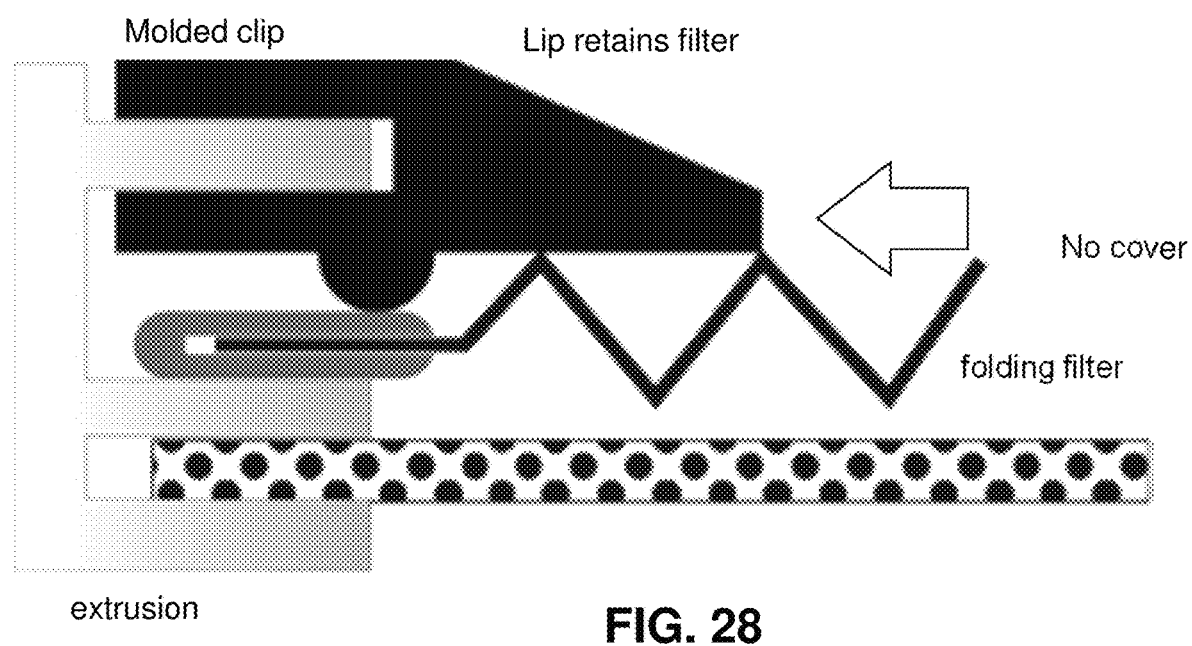
FIG. 28 is a side view of an edge portion of a filter assembly according to at least one embodiment.

In the filter assembly according to FIG. 28, a peripheral frame segment serves as a clip retaining a screen and an expandable replaceable filter element. The frame segment may, for example, be an extruded strip segment. In cross-sectional view the frame segment has an outer edge wall and three inward extending strips between which two slots are formed for respectively retaining the screen and filter element. The screen is retained in a first slot defined between a lower strip and a central strip. The filter element is retained in a second slot defined between the central strip and an upper strip. A bezel clip mounts onto the upper strip and further engages to retain the filter element. An inward extending bead along a lower face of the bezel clip helps to retain the filter element. The filter element has an accordion folding filter medium and an edge cuff in which a peripheral edge of the filter medium is captured. The filter element is retained along the frame segment and bezel clip by engagement of the edge cuff within the second slot and with the bead of the bezel clip.

Figure 29A:
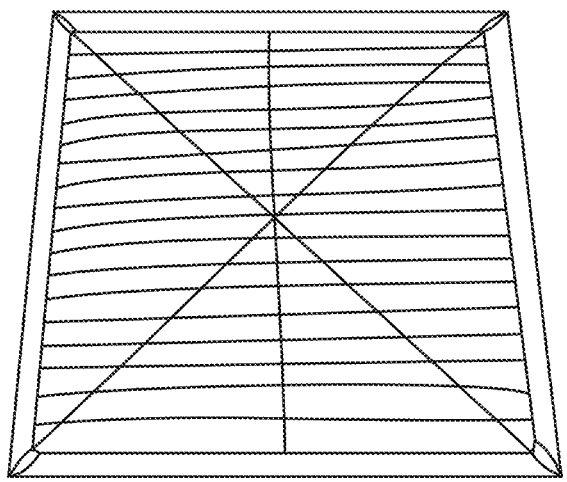
FIG. 29A shows a filter assembly, according to at least one embodiment.
Figure 29B:
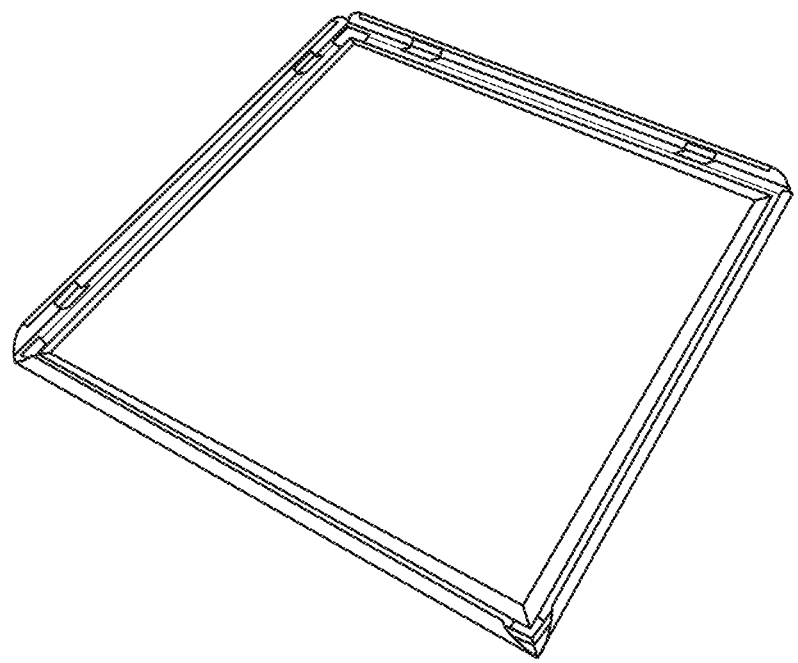
FIG. 29B shows the frame of the filter assembly of FIG. 29A.

FIG. 29A shows a filter assembly, according to at least one embodiment, in which a peripheral frame retains an expandable replaceable filter element. The frame, as shown in FIG. 29B, has four linear segments, each having a hinging bezel that snaps onto a respective edge of the filter element. The filter element is foldable for reduction to convenient size for shipping and storage as shown for multiple embodiments of the drawings. The frame is shown without the filter element in the other of the two views.

Figure 30A:
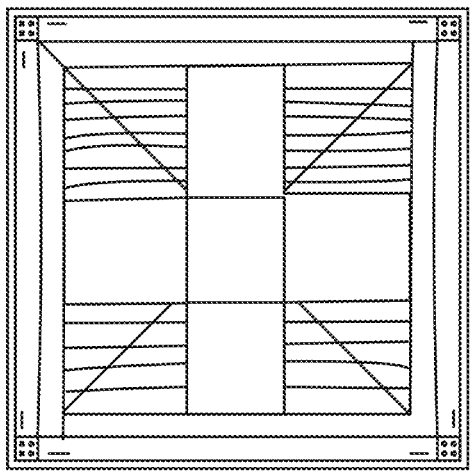
FIG. 30A shows a filter assembly, according to at least one embodiment, having a frame and a filter element in place for use.
Figure 30B:
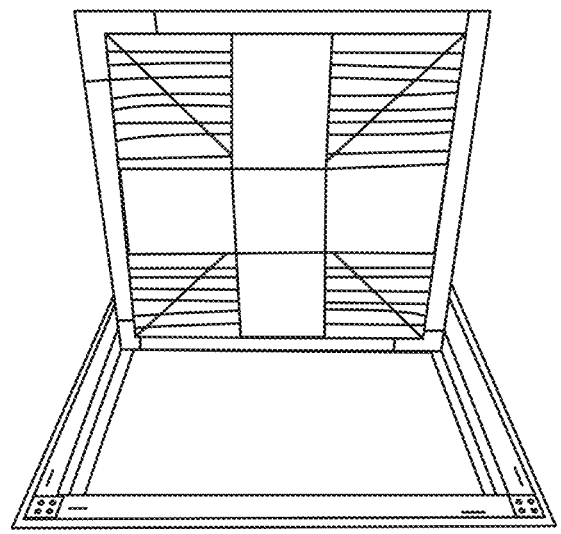
FIG. 30B shows the filter assembly of FIG. 30A, with the filter element raised.

FIGS. 30A and 30B show a filter assembly according to at least one embodiment. A peripheral frame retains an expandable replaceable filter element. The frame has four linear segments. The filter element is foldable for reduction to convenient size for shipping and storage as shown for multiple embodiments of the drawings. The frame is shown with the filter element in place in FIG. 30A, and with the filter element raised in FIG. 30B. The filter element has a C-channel outer sub-frame and a filter media element having edges retained by the outer sub-frame. A particular embodiment of a support insert is shown as a grid of arms parallel to the sub-frame edges and joined at the center of the filter element to serve as a grate.

Figure 31A:
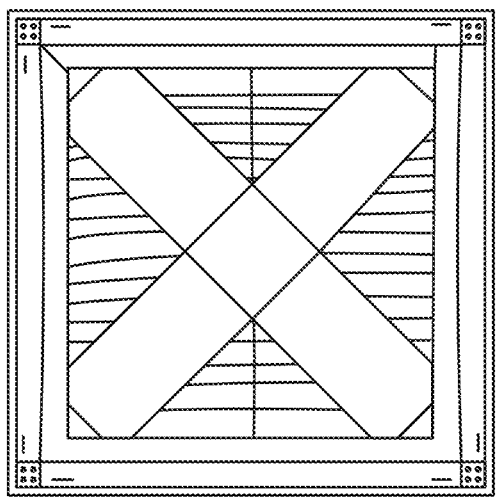
FIG. 31A shows a filter assembly, according to at least one embodiment, having a frame and a filter element in place for use.
Figure 31B:
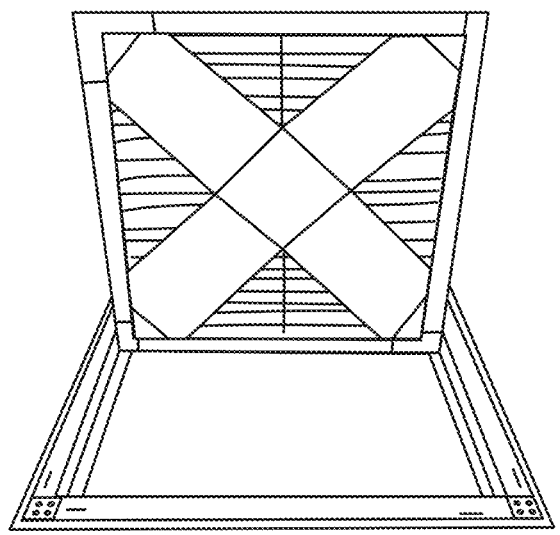
FIG. 31B shows the filter assembly of FIG. 31A, with the filter element raised.

FIGS. 31A and 31B show a filter assembly according to at least one embodiment. A peripheral frame retains an expandable replaceable filter element. The frame has four linear segments. The filter element is foldable for reduction to a convenient size for shipping and storage as shown for multiple embodiments of the drawings. The frame is shown with the filter element in place in FIG. 31A, and with the filter element raised in FIG. 31B. The filter element has a C-channel outer sub-frame and a filter media element having edges retained by the outer sub-frame. A particular embodiment of a support insert is shown as a grid of arms, each of two arms extending corner to corner angled relative to the sub-frame edges and joined at the center of the filter element to serve as a grate.

Figure 32A:
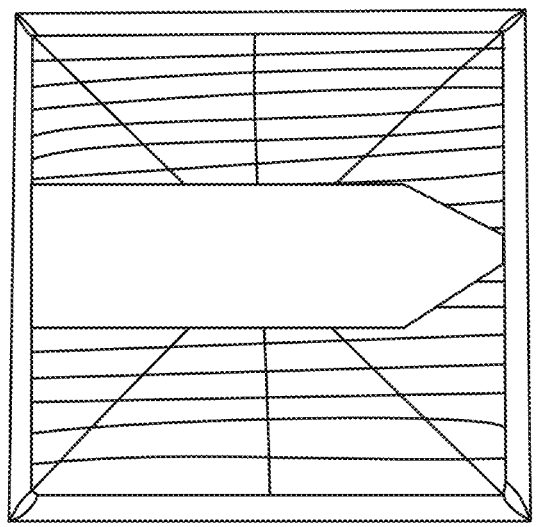
FIG. 32A shows a filter assembly, according to at least one embodiment, having a support insert in place.
Figure 32B:
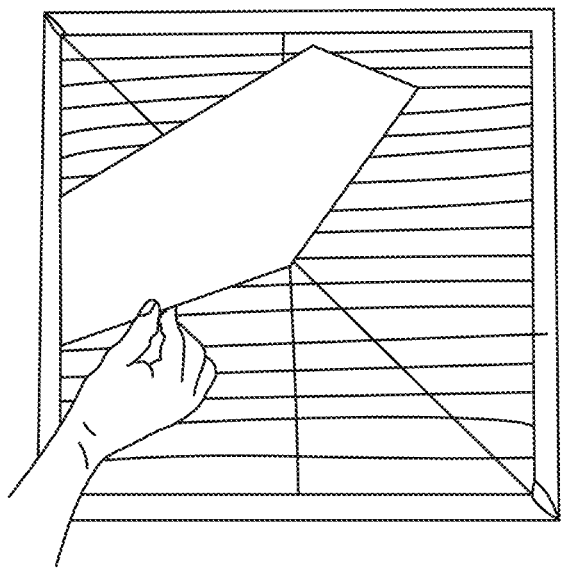
FIG. 32B shows the filter assembly of FIG. 32A, having the support insert raised.

FIGS. 32A and 32B show a filter assembly according to at least one embodiment. A peripheral frame retains an expandable replaceable filter element. The frame has four linear segments. The filter element is foldable for reduction to convenient size for shipping and storage as shown for multiple embodiments of the drawings. The filter element has a C-channel outer sub-frame and a filter media element having edges retained by the outer sub-frame. A particular embodiment of a support insert is shown as a single arm having a tapered end that engages removably under an edge of the sub-frame so as to support and retain the filter media element. The support insert is shown in place in FIG. 32A, and raised in FIG. 32B.

FIG. 33A shows a filter assembly, according to at least one embodiment. A peripheral frame retains an expandable replaceable filter element. The frame has four linear segments joined at four corners. The frame includes fasteners at the four corners to retain the filter element. The filter element is foldable for reduction to convenient size for shipping and storage as shown for multiple embodiments of the drawings. The filter element (FIG. 33B) has a C-channel outer sub-frame and a filter media element having edges retained by the outer sub-frame. A particular embodiment of a support insert is shown in FIG. 33C as a grid of four arms attached to a central hub. The arms can fold together out of the filter plane for reduction to a convenient size. For use, the arms spread apart into the filter plane, extending at 90 degree intervals, to engage the sub-frame or frame segments so as to serve as a grate as shown in FIG. 33A.

FIGS. 34A-34C show a similar embodiment as shown in FIGS. 33A-33C. In FIGS. 34A-34C the four arms of the support insert in this embodiment meet and are joined by a hub element at the center of the rectangular form of the filter element.

Figure 35A:
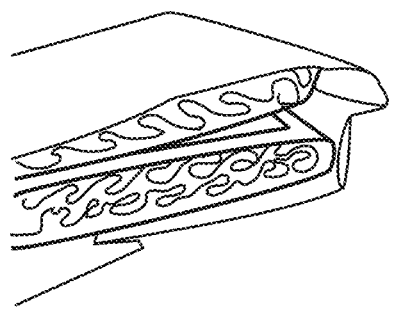
FIG. 35A shows a filter element in a package, according to at least one embodiment.
Figure 35B:
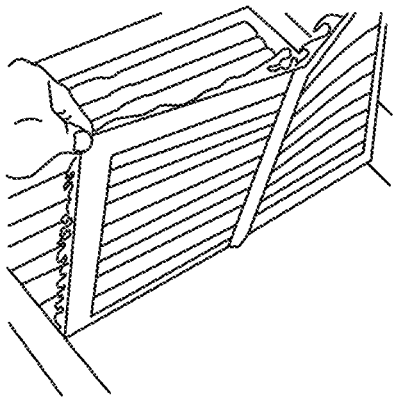
FIG. 35B shows the filter element of FIG. 35A at least partially expanded.
Figure 35C:
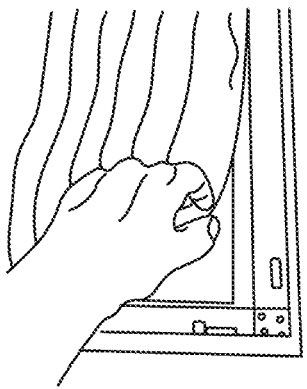
FIG. 35C shows a corner portion of the filter element of FIG. 35A positioned to engage a frame.

FIG. 35A shows a filter element in a folded state in a package, according to at least one embodiment, for shipping or storage. FIG. 35B shows the filter element of FIG. 35A, removed from the package and at least partially unfolded. FIG. 35C shows the foldable filter element having magnetic strips at outer edges to engage corresponding magnets or magnetically responsive materials at the inner edges of a frame.

FIGS. 36A-36B show a frame and grate for a filter assembly according to at least one embodiment termed herein as a "snap frame." The assembly includes four linear segments defining an outer rectangular form of variable dimensions in the filter plane according to the lengths of the segments. A grid of spaced arms defining rectangular spaces therebetween extends across the interior of the filer assembly to serve as a grate to support a filter media element. At least one clip along each frame segment secures the grid to the frame. The clips may secure the edges of a filter media element to the frame and grid as well. A variety of alternative grid patterns are also shown in FIG. 36C.

FIG. 37A shows an edge portion of a filter assembly according to at least one embodiment. A peripheral frame segment serves as a clip retaining an expandable replaceable filter element and optionally a screen (see for example FIG. 28 for a screen). The frame segment may, for example, be an extruded strip segment. As shown in FIG. 37B, the frame segment has an outer edge wall and three inward extending strips between which two slots are formed for respectively retaining the screen and filter element. The screen or grate may be retained in a first slot defined between a lower strip and a central strip. The filter element is retained in a second slot defined between the central strip and an upper strip. A bezel clip, shown separately in FIG. 37D, mounts onto the upper strip as shown in FIG. 37B, and further engages and retains the filter element as shown in FIG. 37A.

Figure 38A:
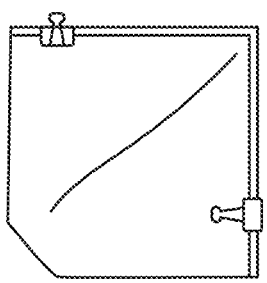
FIG. 38A shows a portion of a filter media element, according to at least one embodiment.
Figure 38B:
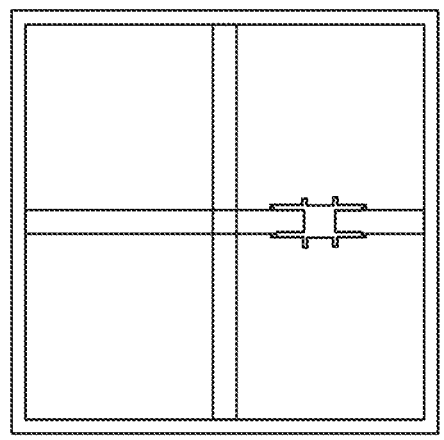
FIG. 38B is a filter assembly, according to at least one embodiment, in which the filter media element of FIG. 38A is used.
Figure 38C:
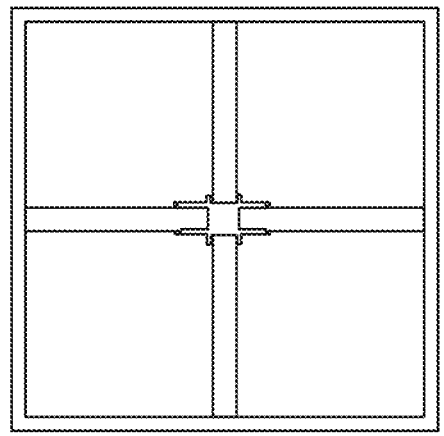
FIG. 38C is another view of the filter assembly of FIG. 38B.

FIG. 38C shows a filter assembly according to at least one embodiment. A filter element (FIG. 38A), which is foldable for reduction to convenient size for shipping and storage, has an outer sub-frame and a filter media element having edges retained by the outer sub-frame. A grid of linear arms (FIGS. 38B and 38C) attached together at the center of the assembly in the filter plane serves as a grate to support the filter media element.

FIG. 39A shows a filter assembly, according to at least one embodiment, in which a filter element, which is foldable for reduction to convenient size for shipping and storage, has an outer sub-frame and a filter media element having edges retained by the outer sub-frame. A grid of linear arms attached together at the center of the assembly in the filter plane serves as a grate to support the filter media element. In the expanded configuration, the filter assembly has a square form. The four arms are joined by a folding bracket hub (FIGS. 39B-39D), termed herein a "boomerang bracket," having a hinge aligned along a 45 degree central axis of the filter media element relative to the sides of the square form. Folding the bracket hub about the hinge advantageously facilitates reducing the filter element to the illustrated fold pattern of FIG. 21C.

Figure 40A:
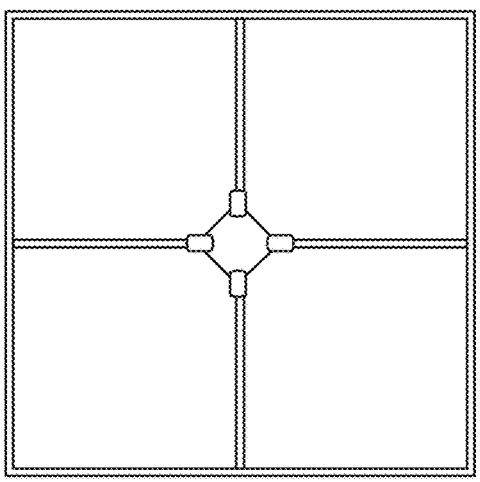
FIG. 40A shows a filter assembly, according to at least one embodiment, in an expanded planar state.
Figure 40B:
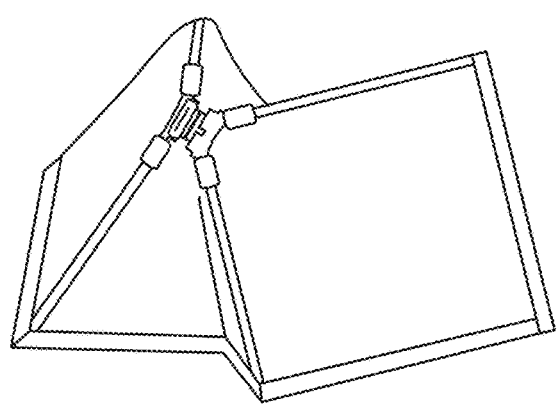
FIG. 40B shows the filter assembly of FIG. 40B, in a partially folded state.
Figure 40C:
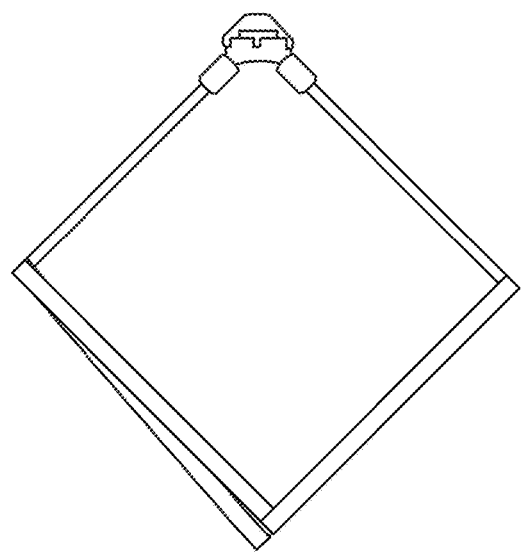
FIG. 40C shows the filter assembly of FIG. 40B, in a further folded state.

FIGS. 40A-40C show a filter assembly according to at least one embodiment. The illustrated filter assembly is similar to that shown in FIG. 39A, and is foldable by use of the folding bracket hub to the illustrated fold pattern of FIG. 21C, also shown in FIG. 40C.

Figure 41A:
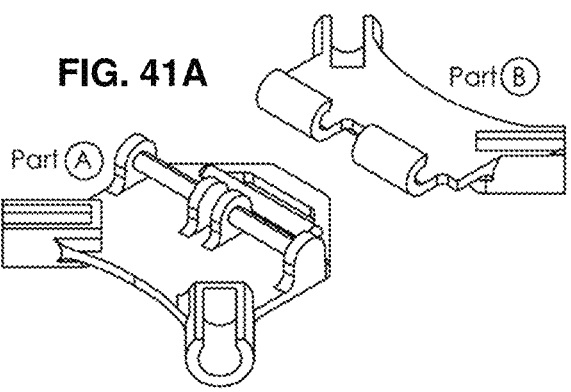
FIG. 41A shows two separated components of the folding bracket hub of FIG. 39B, according to at least one embodiment.
Figure 41B:
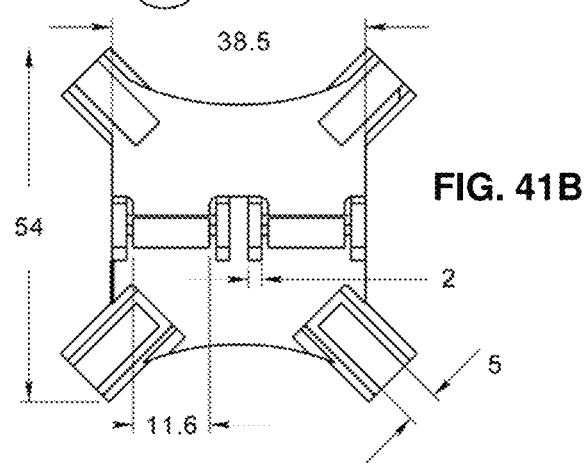
FIG. 41B is a plan view of the folding bracket hub in the state of FIG. 39D, according to at least one embodiment.
Figure 41C:
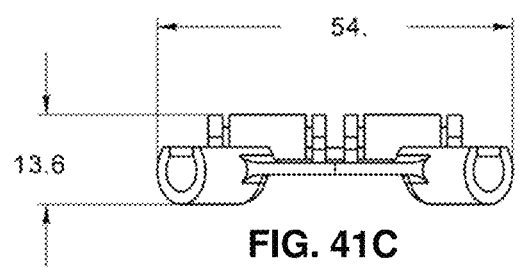
FIG. 41C is an elevation view of the folding bracket hub in the state of FIG. 39D, according to at least one embodiment.

FIGS. 41A-41C further show the construction of the folding bracket hub of FIGS. 39B-39D, according to at least one embodiment. The folding bracket hub has two base elements, joined by the hinge, which are brought together when the bracket hub is reduced to the folded configuration, and which spread into the filter plane when the bracket hub is opened to the expanded configuration. Each base element carries two sockets, each for receiving an inner end of an arm in male-female engagement. The sockets are directed at 90 degree intervals from each other so that, in the expanded configuration with an arm carried by each socket, the arms are arranged at 90 increments in the filter plane, each extending outward to a respective outer edge of the filter assembly (see FIGS. 39A and 40A for example).

Figure 42:
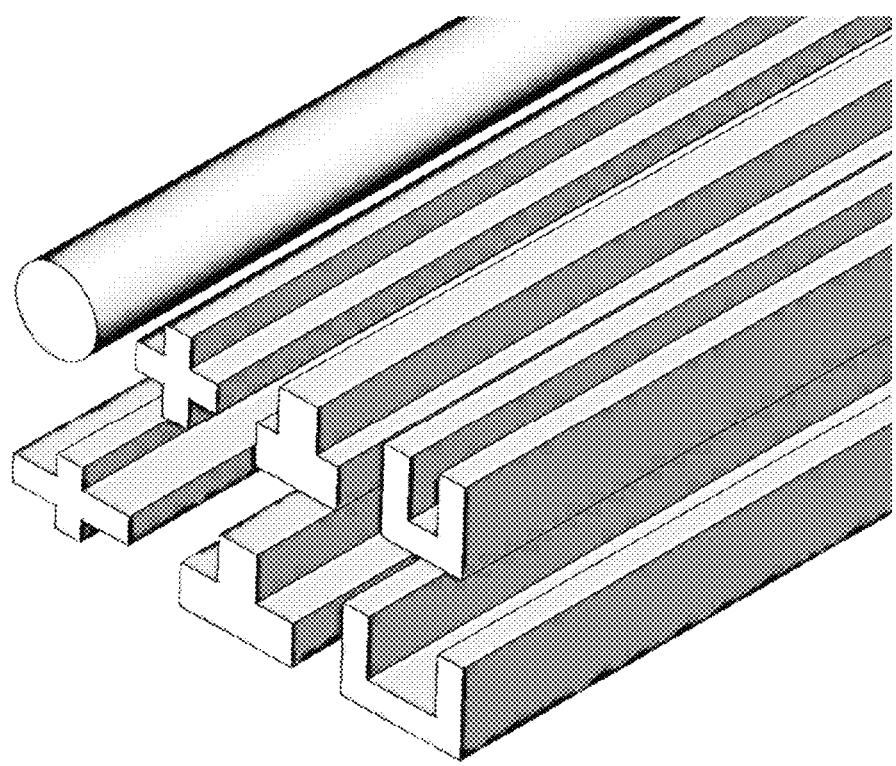

FIG. 42 shows a variety of arms for use with the folding bracket hub of FIGS. 41A-41C. The sockets of the bracket hub in FIG. 41A are shown as circularly cylindrical with longitudinal slits to accommodate some size range or shape variety in the arms they retain. The sockets in other embodiments may take other forms corresponding to or otherwise accommodating any of the arms shown in FIG. 42. Other cross-sectional shapes of both arms and sockets are within the scope of these descriptions beyond those explicitly illustrated.

Figure 43A:
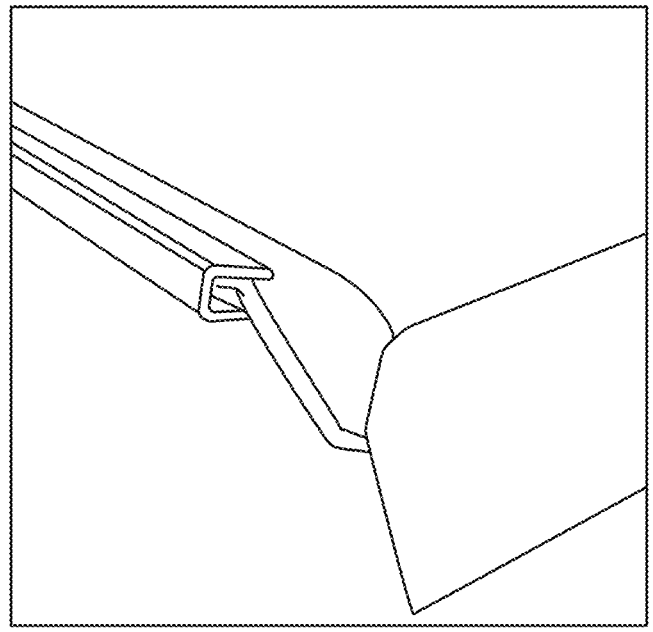
Figure 43B:
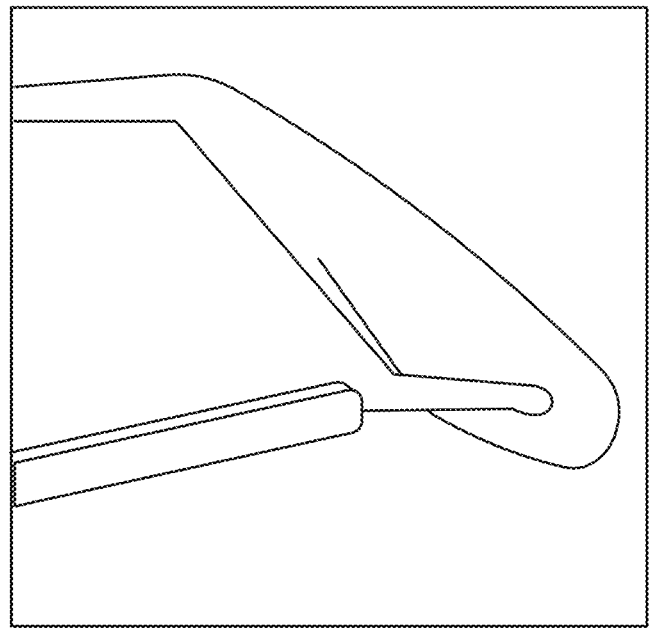

FIGS. 43A and 43B show an edge treatment for a filter media element, according to at least one embodiment. An edge treatment, in one embodiment, includes a C-channel strip that clips onto and retains an edge of the filter media element. The C-channel strip for example may be rigid along its length, and may be formed for example by extrusion. An edge treatment, in another embodiment, includes a deformable C-channel gasket, formed of foam or other resilient compressible material, serving as a seal between edges of the filter media element and any outer frame or other host structure.

Figure 44:
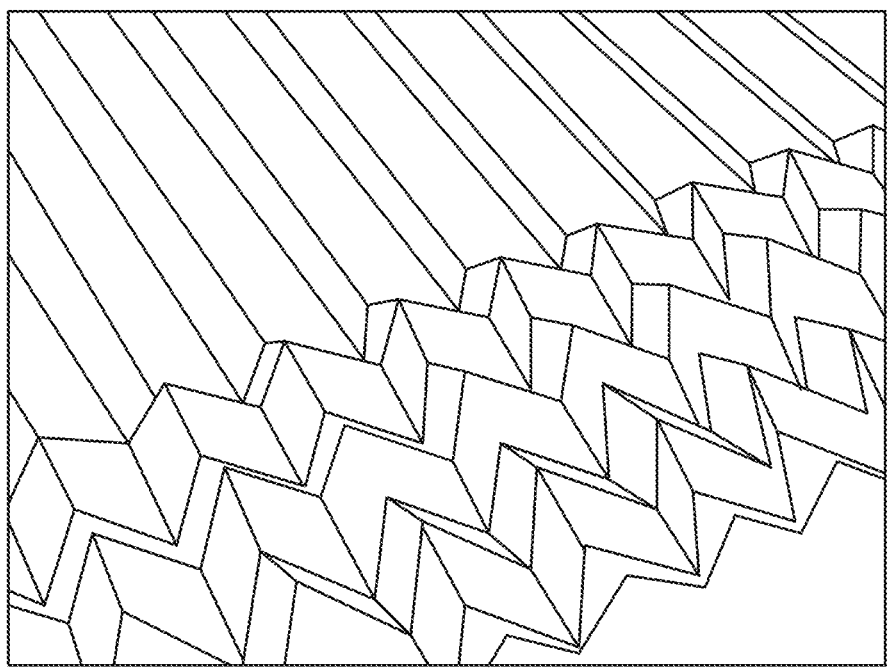

FIG. 44 shows an expandable filter media element having an advantageous fold pattern to facilitate reduction of the media element two dimensions so as to take up a smaller area for convenient shipping, storage, or variable sizing.

Figure 45A:
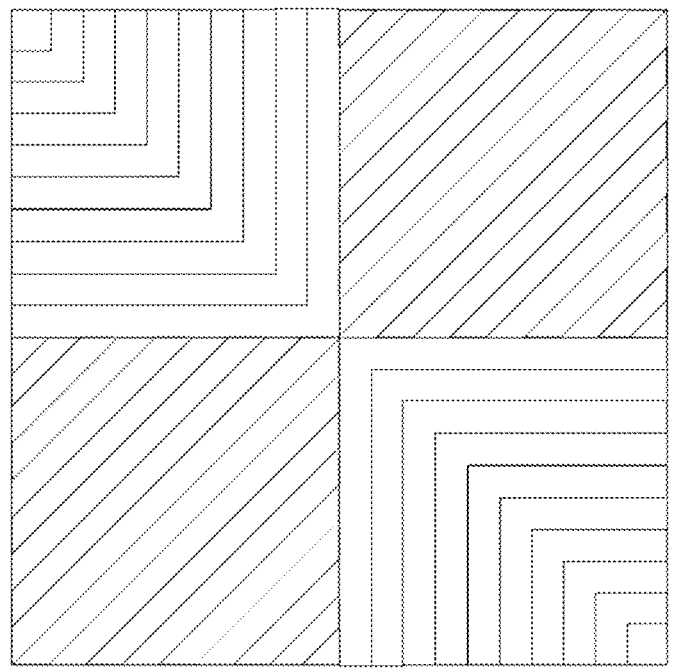
Figure 45B:
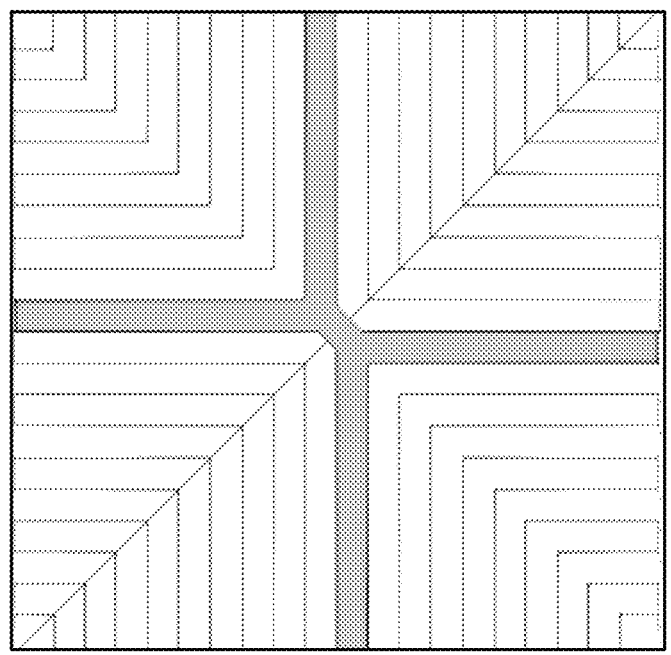

FIG. 45A shows an expandable filter media element having a preferential fold pattern to facilitate two-dimensional reduction of the media element for convenient shipping, storage, or variable sizing. In FIG. 45A, a collapsible cross grate having four arms connected to a central strip can be formed of profiled spring steel having a cylindrical concave side and opposing cylindrically convex side. Such material with such form is advantageously flexible and biases toward an expanded configuration when deployed.

Figure 46A:
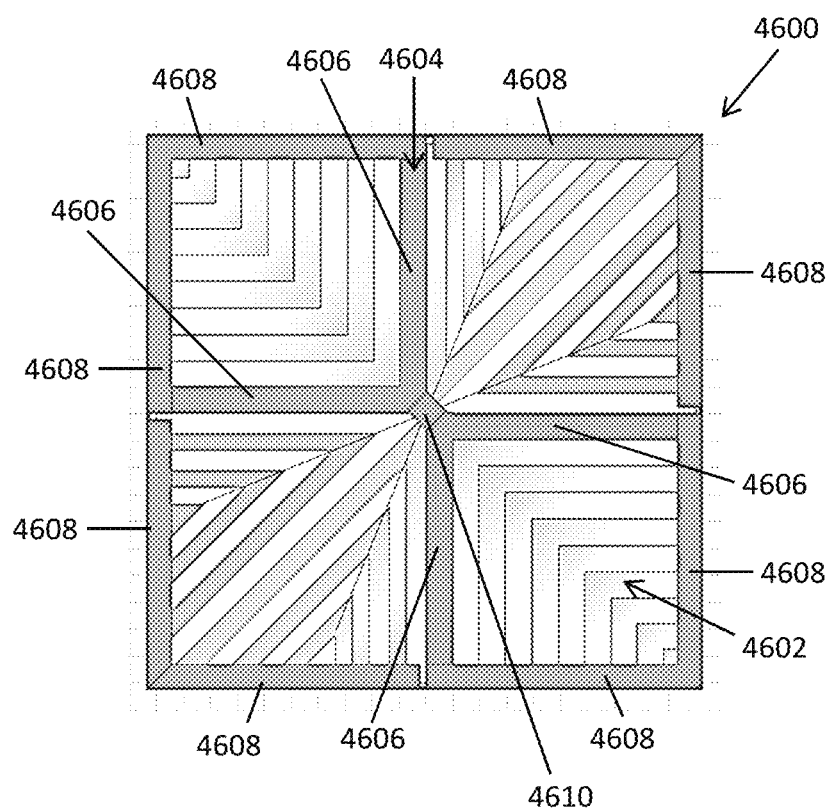
Figure 46B:
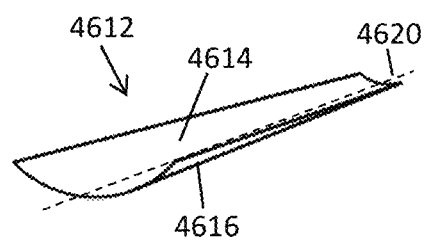

FIG. 46A shows an expandable filter media element 4600 having a filter medium 4602 that features an advantageous fold pattern to facilitate two-dimensional reduction of the filter media element 4600 for convenient shipping, storage, or variable sizing. A collapsible cross grate 4604 having four arms 4606 connected to a central strip 4610 can be formed of profiled spring steel elements having opposing curvatures on opposing sides. Additional edge segments 4608 of same, similar, or other semi-rigid resilient material are shown along edges and corners of the media element 4600. As shown in FIG. 46B, the profiled spring steel element 4612 has a cylindrical concave (channeled) side 4614 and an opposing cylindrical convex side 4616. Advantageously, the profiled spring steel 4612 is self-biased from any flexed or folded state toward its linear state, in which it extends along its longitudinal channel axis 4620 defined along its cylindrically concave side 4614, and thus provides opening and unfolding forces and self-expanding action in the filter media element 4600 to the planar state of FIG. 46A when a folded filter media element is released for example from a package or other binding used for shipping and storage in a reduced state.

Figure 47B:
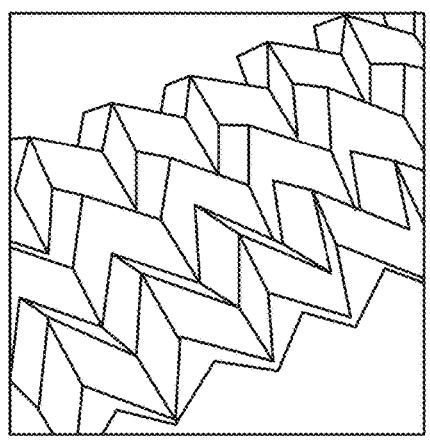
Figure 47C:
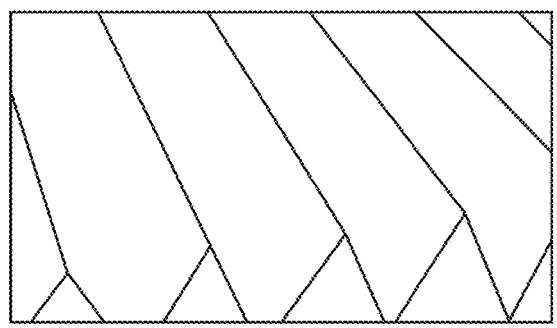

FIG. 47A shows a first side of an expandable filter element having a creased filter media element having a preferential fold pattern to facilitate two-dimensional reduction of the media element for convenient shipping, storage, or variable sizing. The filter element is engaged along its outer edges by a foldable frame having mechanical hinges for size reduction for storage and shipping, and expansion for deployment. The filter element may have a pleated paper top layer (FIG. 47B) over a foam substrate (FIG. 47C), according to at least one embodiment.

FIG. 48A shows a second side of the expandable filter element of FIG. 47A. The filter media element has four quadrants, with each being symmetric with a diagonally opposing element, such that two quadrant types each having a characteristic fold pattern are shown. Two first-type fold quadrants 4802 are diagonally opposed across the center of the media element, and two second-type fold quadrants 4804 are diagonally opposed across the center of the media element adjacent to and between the first-type fold quadrant 4802. As shown, a folding bracket hub and arms may be included with the expandable filter element of FIG. 48A. Semi-rigid struts, for example constructed of a plastic such as PET, may also be included along edges of the filter element. An edge treatment, formed of foam or other resilient compressible material (FIG. 48B), may also be included serving as a seal between edges of the filter element and any outer frame or other host structure.

FIG. 49 shows a first side ("TOP VIEW") of an expandable filter having a creased filter media element having an advantageous fold pattern to facilitate two-dimensional reduction of the media element for convenient shipping, storage, or variable sizing. The filter element is engaged along its outer edges by a foldable foam frame, which may serve as a seal between edges of the filter element and any outer frame or other host structure.

FIG. 50 shows a second side ("BACK VIEW") of the expandable filter element of FIG. 47A. A grid of linear arms attached together at the center of the assembly in the filter plane serves as a grate to support the filter media element. In the expanded configuration, the filter assembly has a square form. The four arms are joined by a folding hub having a locking hinge with springs. The hub is foldable along two axes, perpendicular to each other and each parallel to a side of the square form of the expanded filter assembly. Four arms extend from the hub defining four square quadrants in the square form. The folding hub and arms define a folding grate for supporting the filter media element. FIGS. 51 and 52 show the folding grate of FIG. 50 without a filter media element.

FIG. 53 shows an expandable filter element similar to that of FIG. 50. The folding hub of FIG. 53, in contrast with that of FIG. 50, has an open central square area, which may advantageously accommodate gathered filter media at the center of the fold pattern when the filter element is reduced by folding. FIG. 54 is an enlarged view of a central portion of the filter element of FIG. 53, showing the open central area and spring elements of the folding hub. FIG. 55 shows the folding grate of FIG. 50 without a filter media element.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. An air filter assembly for a heating and ventilation air conditioner (HVAC) system, the filter assembly comprising:
    a filter media element having peripheral edges; and
    a frame including flexible arms each engaging and supporting a respective one of the peripheral edges of the filter media element, each flexible arm being self-biased toward a linear state such that the air filter assembly is biased by the flexible arms to a rectangular configuration in which the filter media element is in an expanded state for use within an airflow of an HVAC system.

2. The air filter assembly of claim 1, wherein the linear flexible arms bias the frame toward a rectangular configuration of variable dimensions.

3. The air filter assembly of claim 1, wherein the frame comprises four flexible arms and four corners, each corner defined by intersecting ends of two adjacent flexible arms.

4. The air filter assembly of claim 1, wherein the air filter assembly is collapsible, by flexure of the flexible arms, from the rectangular configuration to a reduced configuration for shipping or storage.

5. The air filter assembly of claim 4, wherein the filter element is at least twice folded in the reduced configuration of the air filter assembly.

6. The air filter assembly of claim 1, further comprising an edge treatment forming a seal between the filter media element and frame.

7. The air filter assembly of claim 1, wherein each flexible arm comprises a spring steel element.

8. The air filter assembly of claim 7, wherein the flexible arms together provide opening forces to the filter media element toward the expanded state when the air filter assembly is released from a reduced configuration in a package used for shipping.

9. The air filter assembly of claim 7, wherein each flexible arm has a cylindrical concave side and an opposing cylindrically convex side.

10. The air filter assembly of claim 9, wherein each flexible arm is self-biased from a flexed or folded state toward the linear state thereof, in which the flexible arm extends along a longitudinal channel axis defined along the cylindrically concave side thereof.

11. The air filter assembly of claim 1, wherein the filter media element comprises an undulating non-woven pile layer.

12. The air filter assembly of claim 11, wherein the filter media element comprises a grid fiber layer.

13. The air filter assembly of claim 1, further comprising edge treatments attached to respective peripheral edges of the filter media element.

14. The air filter assembly of claim 1, further comprising an edge treatment for forming a peripheral seal.

15. The air filter assembly of claim 14, wherein the edge treatment comprises at least one of a deformable gasket, a flange, and a layer for forming a seal at a peripheral edge of the filter media element.

* * * * *